US011248069B2

(12) United States Patent
Tanaka et al.

(10) Patent No.: US 11,248,069 B2
(45) Date of Patent: Feb. 15, 2022

(54) 4-METHYL-1-PENTENE POLYMER, RESIN COMPOSITION AND MOLDED ARTICLE

(71) Applicant: MITSUI CHEMICALS, INC., Tokyo (JP)

(72) Inventors: Masakazu Tanaka, Yokohama (JP); Masahiko Okamoto, Chiba (JP); Makoto Nakano, Chiba (JP); Sadahiko Matsuura, Iwakuni (JP)

(73) Assignee: MITSUI CHEMICALS, INC., Tokyo (JP)

(*) Notice: Subject to any disclaimer, the term of this patent is extended or adjusted under 35 U.S.C. 154(b) by 427 days.

(21) Appl. No.: 16/078,594

(22) PCT Filed: Feb. 21, 2017

(86) PCT No.: PCT/JP2017/006278
§ 371 (c)(1),
(2) Date: Aug. 21, 2018

(87) PCT Pub. No.: WO2017/150265
PCT Pub. Date: Sep. 8, 2017

(65) Prior Publication Data
US 2019/0048109 A1 Feb. 14, 2019

(30) Foreign Application Priority Data
Mar. 3, 2016 (JP) .............................. JP2016-040926

(51) Int. Cl.
*C08F 10/14* (2006.01)
*C08J 5/18* (2006.01)
(Continued)

(52) U.S. Cl.
CPC .............. *C08F 10/14* (2013.01); *B29C 48/00* (2019.02); *B29C 48/022* (2019.02); *C08J 5/18* (2013.01);
(Continued)

(58) Field of Classification Search
CPC ...... C08F 10/14; C08F 2800/10; C08L 23/20; B29C 48/022; B29C 48/00; B29C 48/03;
(Continued)

(56) References Cited

U.S. PATENT DOCUMENTS 9,023,906 B2   5/2015  Okamoto et al.
9,309,402 B2   4/2016  Maekawa et al.
(Continued)

FOREIGN PATENT DOCUMENTS

EP       1 816 146 A1    8/2007
JP       2007-224311 A   9/2007
(Continued)

OTHER PUBLICATIONS

International Search Report with English language translation and Written Opinion issued in International Application No. PCT/JP2017/006278 dated Mar. 21, 2017.
(Continued)

*Primary Examiner* — Gerard Higgins
(74) *Attorney, Agent, or Firm* — Foley & Lardner LLP

(57) ABSTRACT

A 4-methyl-1-pentene polymer having: a unit derived from 4-methyl-1-pentene of 90 to 100% by mol; a unit selected from ethylene and an α-olefin, other than 4-methyl-1-pentene, having 3 to 20 carbon atoms of 0 to 10% by mol; and the polymer satisfying the following requirements: (a) a meso diad fraction measured by $^{13}$C-NMR within the range of 98 to 100%; (b) a ratio of Z-average molecular weight Mz to weight-average molecular weight Mw measured by GPC within the range of 2.5 to 20; (c) a ratio of weight-average molecular weight Mw to number-average molecular weight Mn measured by GPC within the range of 3.6 to 30; (d) a melt flow rate measured under conditions of 260° C. and a
(Continued)

5 kg load (ASTM D1238) within the range of 0.1 to 500 g/10 min; and (e) an amount of a decane-soluble portion at 23° C. is 5.0% by mass or less.

16 Claims, 1 Drawing Sheet

(51) Int. Cl.
    *C08L 23/20*     (2006.01)
    *B29C 48/00*     (2019.01)
    *B29C 48/03*     (2019.01)
    *B29K 23/00*     (2006.01)

(52) U.S. Cl.
    CPC .............. *C08L 23/20* (2013.01); *B29C 48/03* (2019.02); *B29K 2023/18* (2013.01); *C08F 2800/10* (2013.01); *C08J 2323/20* (2013.01)

(58) Field of Classification Search
    CPC .. B29C 48/08; B29C 45/00; C08J 5/18; C08J 2323/20; B29K 2023/18
    USPC ................................ 428/339, 221, 220, 36.7
    See application file for complete search history.

(56) References Cited

U.S. PATENT DOCUMENTS

| | | | |
|---|---|---|---|
| 2006/0135712 A1* | 6/2006 | Satoh | ..................... C08F 10/00 526/160 |
| 2008/0004412 A1 | 1/2008 | Matsumoto et al. | |
| 2010/0179295 A1 | 7/2010 | Yasuda et al. | |
| 2010/0298517 A1 | 11/2010 | Tanaka | |
| 2010/0324239 A1 | 12/2010 | Matsumoto et al. | |
| 2011/0282017 A1 | 11/2011 | Kaji et al. | |
| 2012/0283399 A1 | 11/2012 | Yamamoto et al. | |
| 2013/0059990 A1 | 3/2013 | Kaji et al. | |
| 2014/0011965 A1 | 1/2014 | Maekawa et al. | |
| 2014/0088214 A1 | 3/2014 | Okamoto et al. | |
| 2014/0343241 A1 | 11/2014 | Tanaka | |
| 2015/0057418 A1 | 2/2015 | Kaji et al. | |
| 2015/0239996 A1 | 8/2015 | Funaya et al. | |
| 2015/0376306 A1 | 12/2015 | Tsurugi et al. | |
| 2016/0376385 A1 | 12/2016 | Funaya et al. | |
| 2017/0240664 A1 | 8/2017 | Tsurugi et al. | |
| 2017/0327610 A1 | 11/2017 | Funaya et al. | |
| 2017/0327611 A1 | 11/2017 | Funaya et al. | |

FOREIGN PATENT DOCUMENTS

| | | | |
|---|---|---|---|
| JP | 2009-286933 A | 12/2009 | |
| JP | 2011-184655 A | 9/2011 | |
| JP | 2011-208149 A | 10/2011 | |
| JP | 2012-036270 A | 2/2012 | |
| JP | 2013-122061 A | 6/2013 | |
| JP | 2015-074645 A | 4/2015 | |
| JP | 2015-183141 A | 10/2015 | |
| JP | 2015-183332 A | 10/2015 | |
| JP | 2016-098257 | 5/2016 | |
| WO | WO-2006/054613 A1 | 5/2006 | |
| WO | WO-2010/055652 A1 | 5/2010 | |
| WO | WO-2011/078054 A1 | 6/2011 | |
| WO | WO-2011/142400 A1 | 11/2011 | |
| WO | WO-2012/137681 A | 10/2012 | |
| WO | WO-2012/157709 A1 | 11/2012 | |
| WO | WO-2013/146337 A1 | 10/2013 | |
| WO | WO-2014/050817 A1 | 4/2014 | |
| WO | WO-2014/123212 A1 | 8/2014 | |

OTHER PUBLICATIONS

Japanese Decision of Refusal dated Oct. 1, 2019 for corresponding Application No. 2018-503053 (2 pages).
Extended European Search Report issued on European Application No. 17759731.7, dated Aug. 29, 2019.

* cited by examiner

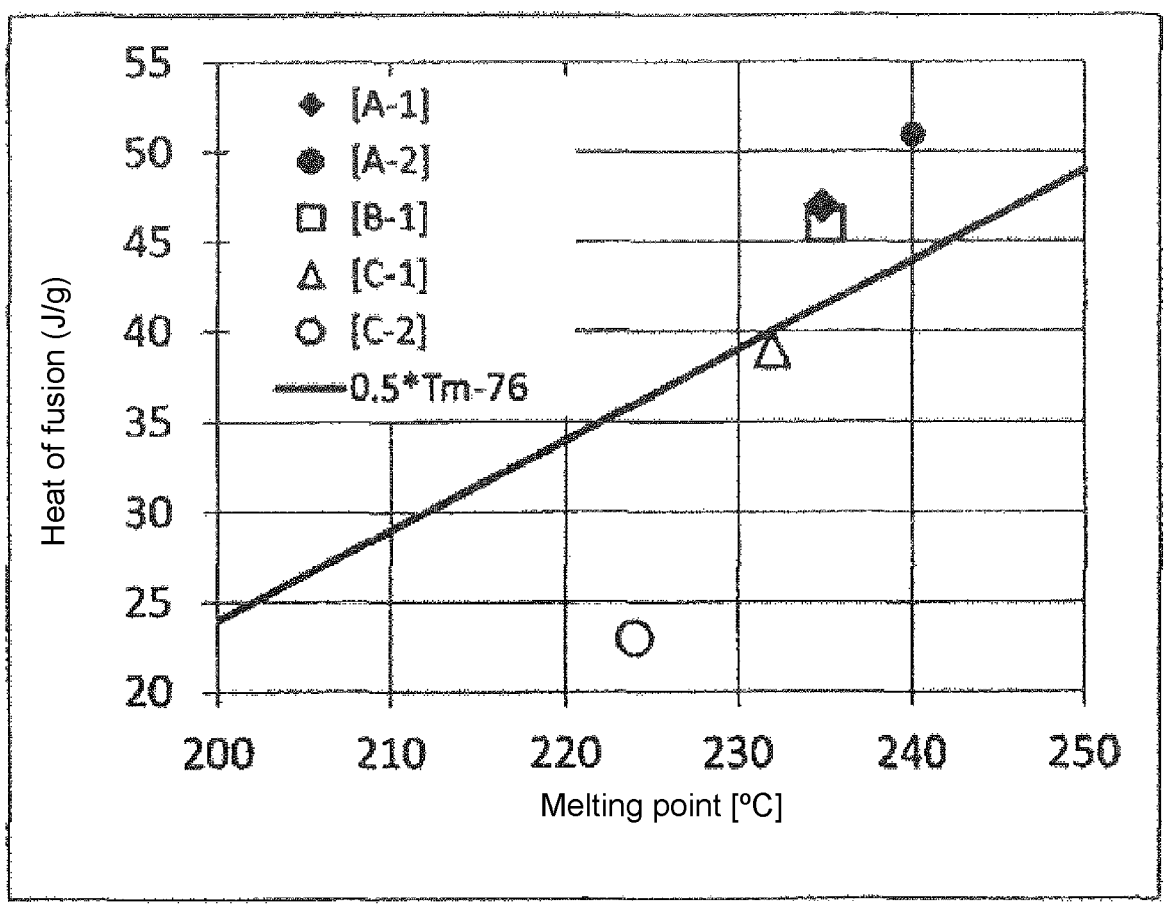

4-METHYL-1-PENTENE POLYMER, RESIN COMPOSITION AND MOLDED ARTICLE

RELATED APPLICATIONS

The present application claims priority under 37 U.S.C. § 371 to International Patent Application No. PCT/JP2017/006278, filed Feb. 21, 2017, which claims priority to and the benefit of Japanese Patent Application No. 2016-040926, filed on Mar. 3, 2016. The contents of these applications are hereby incorporated by reference in their entireties.

TECHNICAL FIELD

The present invention relates to a 4-methyl-1-pentene polymer having specific physical properties, and a resin composition and a molded article comprising the same.

BACKGROUND ART

4-Methyl-1-pentene-α-olefin copolymers with 4-methyl-1-pentene as a main constitutional monomer are excellent in heat resistance, mold release properties, and chemical resistance and therefore widely used for various purposes. For example, films made of the copolymers are used in FPC mold releasing films, mold releasing films for composite material molding, etc. by exploiting features such as favorable mold release properties, or used in experimental instruments and mandrels for rubber hose production, etc. by exploiting features such as chemical resistance, water resistance, and transparency.

On the other hand, molded articles made of resin compositions comprising a conventional 4-methyl-1-pentene polymer may need to be improved from the viewpoint of shape retention under a load at a high temperature, i.e., from the viewpoint of heat resistance (see, for example, Patent Literature 1). Since these molded articles contain a given level of low-molecular-weight components derived from the polymer, the molded articles need to be improved from the viewpoint of stain resistance and may be unable to be used for purposes that require high purity (see, for example, Patent Literature 2).

Patent Literature 3 discloses a 4-methyl-1-pentene polymer having high stereoregularity and a high heat of fusion. Patent Literature 4 discloses a molded article improved in shape retaining properties at a high temperature and stain resistance by exploiting the characteristics of the polymer.

CITATION LIST

Patent Literature

Patent Literature 1: Japanese Patent Laid-Open No. 2013-122061
Patent Literature 2: Japanese Patent Laid-Open No. 2007-224311
Patent Literature 3: International Publication No. WO 2014-050817
Patent Literature 4: Japanese Patent Laid-Open No. 2015-183141

SUMMARY OF INVENTION

Technical Problem

As mentioned above, the 4-methyl-1-pentene polymer and the molded article described in Patent Literatures 3 and 4 have high stereoregularity and a high heat of fusion and possess features excellent in heat resistance. However, the studies of the present inventors have revealed that this molded article may produce white turbidity when subjected to sterilization using water vapor, i.e., steam sterilization. The production of white turbidity becomes a problem for purposes that require steam sterilization and emphasize transparency or appearance.

A film obtained from the 4-methyl-1-pentene polymer described in Patent Literatures 3 and 4 possesses features excellent in heat resistance, etc. However, the studies of the present inventors have revealed that this film may elongate insufficiently and may be easily cut when taken up.

An object of the present invention is to solve the problems of the conventional techniques. Specifically, an object of the present invention is to suppress white turbidity in the resulting molded article during steam sterilization without impairing the characteristics, such as high heat resistance, of the 4-methyl-1-pentene polymer, and to improve the elongation of the resulting film without impairing the characteristics, such as high heat resistance, of the 4-methyl-1-pentene polymer.

Solution to Problem

The present inventors have conducted diligent studies to attain the object. As a result, the present inventors have completed the present invention by finding that the object can be attained by a 4-methyl-1-pentene polymer having a specific composition and having specific characteristics.

The present invention relates to the following [1] to [9]:
[1] A 4-methyl-1-pentene polymer wherein: a content of a constitutional unit derived from 4-methyl-1-pentene is 90 to 100% by mol; a content of a constitutional unit derived from at least one olefin selected from ethylene and an α-olefin, other than 4-methyl-1-pentene, having 3 to 20 carbon atoms is 0 to 10% by mol; and the 4-methyl-1-pentene polymer satisfies all the following requirements (a) to (e):
(a) a meso diad fraction (m) measured by $^{13}$C-NMR falls within the range of 98 to 100%;
(b) a ratio of Z-average molecular weight Mz to weight-average molecular weight Mw (Mz/Mw) measured by gel permeation chromatography (GPC) falls within the range of 2.5 to 20;
(c) a ratio of weight-average molecular weight Mw to number-average molecular weight Mn (Mw/Mn) measured by gel permeation chromatography (GPC) falls within the range of 3.6 to 30;
(d) a melt flow rate (MFR) measured under conditions of 260° C. and a 5 kg load in conformity to ASTM D1238 falls within the range of 0.1 to 500 g/10 min; and
(e) an amount of a decane-soluble portion at 23° C. is 5.0% by mass or less.
[2] The 4-methyl-1-pentene polymer according to [1], wherein the 4-methyl-1-pentene polymer further satisfies the following requirement (f):
(f) a proportion of a polymer having a molecular weight of $1 \times 10^6$ or larger measured by gel permeation chromatography (GPC) is 15% by mass or more.
[3] The 4-methyl-1-pentene polymer according to [1] or [2], wherein the 4-methyl-1-pentene polymer further satisfies the following requirement (g):
(g) a heat of fusion and a melting point of the 4-methyl-1-pentene polymer measured by differential scanning calorimetry (DSC) satisfy the following requirements (i) and (ii):
(i) the following expression (1) holds:

$$\Delta Hm \geq 0.5 \times Tm - 76 \qquad \text{Expression (1)}$$

wherein the heat of fusion is defined as ΔHm J/g, and the melting point is defined as Tm ° C.; and (ii) the melting point falls within the range of 200 to 260° C.

[4] A resin composition comprising a 4-methyl-1-pentene polymer according to any of [1] to [3].

[5] A molded article comprising a 4-methyl-1-pentene polymer according to any of [1] to [3] or a resin composition according to [4].

[6] The molded article according to [5], wherein a maximum thickness is 100 mm or smaller, and a minimum thickness is 0.001 mm or larger.

[7] The molded article according to [5] or [6], wherein the molded article is an injection molded article or an extrusion molded article.

[8] The molded article according to [5], wherein the molded article is a film.

[9] An instrument or a container intended for medical treatment, caregiving, infants, physicochemical experiments, food, life, or chemicals, the instrument or the container being a molded article according to any of [5] to [8].

Advantageous Effects of Invention

The present invention can provide a 4-methyl-1-pentene polymer and a resin composition that have high stereoregularity and a high heat of fusion and offer a molded article that can be prevented from producing white turbidity even if steam-sterilized. Use of the 4-methyl-1-pentene polymer and the resin composition of the present invention can further provide a molded article such as a film that has heat resistance and rigidity and is excellent in elongation.

BRIEF DESCRIPTION OF DRAWING

The figure is a graph showing the relationship between a heat of fusion and a melting point in Examples and Comparative Examples.

DESCRIPTION OF EMBODIMENTS

Hereinafter, the 4-methyl-1-pentene polymer according to the present invention, a resin composition comprising the polymer, and a molded article comprising the polymer or the resin composition will be specifically described.

<4-Methyl-1-pentene Polymer (X)>

In the 4-methyl-1-pentene polymer (X) of the present invention, a content of a constitutional unit derived from 4-methyl-1-pentene is 90 to 100% by mol with respect to all constitutional units contained in the polymer (X); a content of a constitutional unit derived from at least one olefin (hereinafter, also referred to as a comonomer) selected from ethylene and an α-olefin, other than 4-methyl-1-pentene, having 3 to 20 carbon atoms is 0 to 10% by mol; and the polymer (X) satisfies requirements (a) to (e) given below; and preferably, the polymer (X) further satisfies one or more of requirements (f) and (g) given below. The requirements thus specified mean that when the 4-methyl-1-pentene polymer (X) is a blend of a plurality of 4-methyl-1-pentene polymers, the blend satisfies the requirements (a) to (e) and preferably further satisfies one or more of the requirements (f) and (g).

Examples of the 4-methyl-1-pentene polymer (X) include homopolymers of 4-methyl-1-pentene (i.e., polymers in which the content of the constitutional unit derived from 4-methyl-1-pentene is 100% by mol) and copolymers of 4-methyl-1-pentene and other olefins.

In this context, the content of the constitutional unit derived from 4-methyl-1-pentene in the 4-methyl-1-pentene polymer (X) is preferably 92 to 100% by mol, more preferably 95 to 100% by mol, with respect to all constitutional units contained in the polymer (X), and the total content of the constitutional unit derived from at least one olefin selected from ethylene and an α-olefin having 3 to 20 carbon atoms (except for 4-methyl-1-pentene) is preferably 0 to 8% by mol, more preferably 0 to 5% by mol, from the viewpoint of transparency and heat resistance.

When the 4-methyl-1-pentene polymer (X) is a copolymer, specific examples of the ethylene and the α-olefin having 3 to 20 carbon atoms to be copolymerized with 4-methyl-1-pentene include ethylene, propylene, 1-butene, 1-pentene, 3-methyl-1-butene, 1-hexene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. Among them, ethylene, propylene, 1-butene, 3-methyl-1-butene, 1-hexene, 3-methyl-1-pentene, 1-octene, 1-decene, 1-dodecene, 1-tetradecene, 1-hexadecene, and 1-octadecene are preferred. These α-olefins may be used alone or in combination of two or more thereof.

In the present invention, the amounts of the constitutional unit derived from 4-methyl-1-pentene and the constitutional unit derived from at least one olefin selected from ethylene and an α-olefin having 3 to 20 carbon atoms (except for 4-methyl-1-pentene) in the 4-methyl-1-pentene polymer (X) can be adjusted by the amounts of 4-methyl-1-pentene and at least one olefin selected from ethylene and an α-olefin having 3 to 20 carbon atoms (except for 4-methyl-1-pentene) to be added during polymerization reaction.

Hereinafter, each requirement to be satisfied by the 4-methyl-1-pentene polymer (X) will be described.

(Requirement (a))

A meso diad fraction (m) measured by $^{13}$C-NMR falls within the range of 98 to 100%, preferably within the range of 98.5 to 100%.

When the meso diad fraction (m) of the 4-methyl-1-pentene polymer (X) is equal to or higher than the lower limit value described above, a molded article comprising the 4-methyl-1-pentene polymer (X) possesses sufficient performance such as heat resistance and rigidity.

In the present invention, the meso diad fraction (m) of the 4-methyl-1-pentene polymer (X) can be adjusted by the type of a catalyst for olefin polymerization mentioned later.

(Requirement (b))

A ratio of Z-average molecular weight Mz to weight-average molecular weight Mw (Mz/Mw) measured by gel permeation chromatography (GPC) falls within the range of 2.5 to 20, preferably within the range of 2.5 to 15, more preferably 2.7 to 15, further preferably 2.8 to 15. When the ratio (Mz/Mw) falls within the range described above, a molded article such as a film comprising the 4-methyl-1-pentene polymer (X) is excellent in tenacity, decreases internal cracks responsible for whitening, and is excellent in the elongation of the film. Also, the ratio (Mz/Mw) that falls within the range described above suggests that the 4-methyl-1-pentene polymer (X) contains a considerable amount of a polymer having a large molecular weight. A method for adjusting the ratio (Mz/Mw) to the range described above is specifically mentioned later.

(Requirement (c))

A ratio of weight-average molecular weight Mw to number-average molecular weight Mn (Mw/Mn) measured by gel permeation chromatography (GPC) falls within the range of 3.6 to 30, preferably within the range of 3.6 to 25, more preferably 3.8 to 25, further preferably 4.0 to 25, especially preferably 4.0 to 15. When the ratio (Mw/Mn) falls within the range described above, a molded article such as a film comprising the 4-methyl-1-pentene polymer (X) is excellent in tenacity, decreases internal cracks responsible for whitening, and is excellent in the elongation of the film. Also, the ratio (Mw/Mn) that falls within the range described above suggests that the 4-methyl-1-pentene polymer (X) contains a considerable amount of a polymer having a large molecular weight. A method for adjusting the ratio (Mw/Mn) of the 4-methyl-1-pentene polymer (X) to the range described above is specifically mentioned later.

(Requirement (d))

A melt flow rate (MFR) of the 4-methyl-1-pentene polymer (X) measured under conditions of 260° C. and a 5 kg load in conformity to ASTM D1238 is 0.1 to 500 g/10 min, preferably 1 to 300 g/10 min, more preferably 2 to 100 g/10 min, further preferably 5 to 80 g/10 min.

The MFR of the 4-methyl-1-pentene polymer (X) that falls within the range described above is preferred from the viewpoint of resin flowability during molded article production.

In the present invention, a method for adjusting the MFR of the 4-methyl-1-pentene polymer (X) includes, for example, a method of adjusting the amount of hydrogen within a reactor during polymerization reaction, or blending plural types of polymers differing in MFR during or after polymerization.

(Requirement (e))

An amount of a decane-soluble portion at 23° C. in the 4-methyl-1-pentene polymer (X) is 5.0% by mass or less, preferably 3.0% by mass or less, more preferably 1.0% by mass or less.

In the present invention, the amount of a decane-soluble portion at 23° C. refers to the ratio of the weight of a polymer (X) dissolved in a n-decane solution to the weight of an added polymer (X) when the 4-methyl-1-pentene polymer (X) is added to n-decane and dissolved by heating at 145° C. for 1 hour, followed by decrease in the temperature of the n-decane solution to 23° C., as specifically mentioned in Examples described later.

A low amount of a decane-soluble portion at 23° C. in the 4-methyl-1-pentene polymer (X) indicates that the amount of a low-molecular-weight polymer contained in the polymer (X) is small. When the amount of a decane-soluble portion at 23° C. in the 4-methyl-1-pentene polymer (X) falls within the range described above, the efflux of a low-molecular-weight component serving as a contaminant component from a molded article obtained from a resin composition comprising the polymer can be suppressed, and the polymer can therefore be suitably used for purposes that require high purity, such as a film.

In the present invention, the amount of a decane-soluble portion at 23° C. in the 4-methyl-1-pentene polymer (X) can be adjusted by the type of a catalyst for olefin polymerization mentioned later.

(Requirement (f))

A proportion of a polymer having a molecular weight of $1 \times 10^6$ or larger measured by gel permeation chromatography (GPC) is 15% by mass or more, preferably 16% by mass or more, more preferably 17% by mass or more. When the proportion falls within the range described above, a molded article such as a film comprising the 4-methyl-1-pentene polymer (X) is excellent in tenacity, decreases internal cracks responsible for whitening, and is excellent in the elongation of the film. Also, the proportion of a polymer having a molecular weight of $1 \times 10^6$ or larger that falls within the range described above suggests that a considerable amount of a component having a large molecular weight is contained therein. The proportion of a polymer having a molecular weight of $1 \times 10^6$ or larger in the 4-methyl-1-pentene polymer (X) can be adjusted to the range described above by allowing hydrogen to coexist in a reactor during polymerization reaction and increasing or decreasing the amount thereof.

(Requirement (g))

A heat of fusion and a melting point of the 4-methyl-1-pentene polymer (X) measured by differential scanning calorimetry (DSC) satisfy the following requirements (i) and (ii):

(i) the following expression (1) holds:

$$\Delta Hm \geq 0.5 \times Tm - 76 \qquad \text{Expression (1)}$$

wherein the heat of fusion is defined as ΔHm J/g, and the melting point is defined as Tm ° C.; and (ii) the melting point falls within the range of 200 to 260° C.

The heat of fusion (ΔH mJ/g) measured by differential scanning calorimetry (DSC) (rate of temperature increase: 10° C./min) in the requirement (i) is preferably 5 to 80 J/g, more preferably 10 to 60 J/g. The melting point (Tm° C.) measured by differential scanning calorimetry (DSC) (rate of temperature increase: 10° C./min) in the requirement (ii) is preferably 200 to 250° C., more preferably 205 to 250° C., further preferably 210 to 245° C.

The requirement (i) indicates that the 4-methyl-1-pentene polymer (X) according to the present invention has a high heat of fusion. Specifically, a feature of the 4-methyl-1-pentene polymer (X) according to the present invention is that the heat of fusion with respect to the melting point is large, i.e., the degree of crystallinity is high. The relationship between a heat of fusion and a melting point in Examples of the present invention and Comparative Examples mentioned later is shown in the Figure as one example indicating the relationship between the heat of fusion and the melting point.

This requirement is specifically disclosed in Patent Literature 3 and similarly disclosed in Patent Literature 4. The 4-methyl-1-pentene polymer disclosed in Patent Literatures 3 and 4 also satisfies this requirement. Comparative Example 1 mentioned later satisfies this requirement, and neither Comparative Example 2 nor 3 satisfies this requirement.

In the present invention, the heat of fusion of the 4-methyl-1-pentene polymer (X) can be adjusted to within the range specified above by using a catalyst for olefin polymerization mentioned later. The melting point can be adjusted by adjusting the proportion of the constitutional unit of 4-methyl-1-pentene in the requirement (a) while using the catalyst for olefin polymerization.

<Feature of 4-methyl-1-pentene Polymer (X)>

The 4-methyl-1-pentene polymer of the present invention has characteristics of being less likely to produce white turbidity even through steam sterilization, as is evident from the contrast between Examples and Comparative Examples mentioned later. Although the reason why white turbidity occurred by steam sterilization in Comparative Examples is not clear, it is predicted that a molded article swells due to the entrance of moisture to the inside during sterilization and produces strain when shrinking in association with cooling after the sterilization, resulting in microcracks.

Larger residual strain ascribable to molding such as injection molding is usually considered to facilitate producing the microcracks described above. Furthermore, a larger content of a high-molecular-weight component in a polymer usually increases residual strain. Nonetheless, the 4-methyl-1-pentene polymer of the present invention is presumed to drastically prevent the microcracks. This is an unexpected effect. A considerable amount of a high-molecular-weight component contained therein probably increases the number of entanglements per unit volume and thereby improves tenacity and suppresses whitening.

Since the 4-methyl-1-pentene polymer of the present invention has a high degree of crystallinity, the physical properties of a film prepared therefrom might also be reduced. Furthermore, a larger content of a high-molecular-weight component in a polymer usually increases orientation and decreases film elongation. Nonetheless, the 4-methyl-1-pentene polymer of the present invention is found to drastically improve film elongation against expectations. Presumably, this is also an effect brought about by a considerable amount of a high-molecular-weight component contained therein that increases the number of entanglements per unit volume and thereby improves tenacity.

<Method for Producing 4-methyl-1-pentene Polymer (X)>

The 4-methyl-1-pentene polymer (X) can be obtained by the polymerization of 4-methyl-1-pentene or by the copolymerization of 4-methyl-1-pentene with at least one olefin selected from ethylene and an α-olefin having 3 to 20 carbon atoms (except for 4-methyl-1-pentene), in the presence of a catalyst for olefin polymerization mentioned later.

[1-1] Catalyst for Olefin Polymerization

The catalyst for olefin polymerization is preferably a catalyst comprising:
a bridged metallocene compound (A); and
at least one or more compound(s) (B) selected from
(B-1) an organometal compound,
(B-2) an organoaluminumoxy compound, and
(B-3) a compound that forms an ionic pair through reaction with the component (A).

<Bridged Metallocene Compound (A)>

The bridged metallocene compound (A) is preferably a compound represented by the general formula [A1], more preferably a compound represented by the general formula [A2].

[Formula 1]

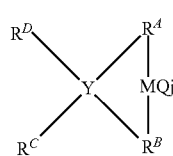

[A1]

In the formula [A1], M is a transition metal of group 4 of the periodic table, for example, a titanium atom, a zirconium atom or a hafnium atom; Q is selected in the same or different combination from a halogen atom, a hydrocarbon group, a neutral conjugated or unconjugated diene having 10 or less carbon atoms, an anion ligand and a neutral ligand capable of being coordinated as a lone electron pair; j is an integer of 1 to 4; $R^A$ and $R^B$ may be the same as or different from each other and each are a mononuclear or polynuclear hydrocarbon residue capable of forming a sandwich structure together with M; Y is a carbon atom or a silicon atom; and $R^C$ and $R^D$ may be the same as or different from each other and are each selected from a hydrogen atom, a hydrocarbon group, a silicon-containing group, a halogen atom and a halogen-containing hydrocarbon group or may be bonded to each other to form a ring.

[Formula 2]

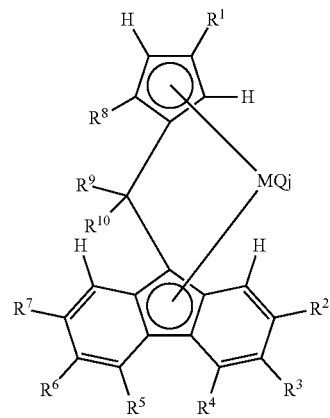

[A2]

In the formula [A2], $R^1$ is a hydrocarbon group, a silicon-containing group or a halogen-containing hydrocarbon group; $R^2$ to $R^{10}$ may be the same as or different from each other and are each selected from a hydrogen atom, a hydrocarbon group, a silicon-containing group, a halogen atom and a halogen-containing hydrocarbon group; each of these substituents may be bonded to another substituent to form a ring; M is a transition metal of group 4 of the periodic table; Q is selected in the same or different combination from a halogen atom, a hydrocarbon group, a neutral conjugated or unconjugated diene having 10 or less carbon atoms, an anion ligand and a neutral ligand capable of being coordinated as a lone electron pair; and j is an integer of 1 to 4.

The bridged metallocene compound represented by the general formula [A2] is particularly preferably a bridged metallocene compound represented by the general formula [A3] from the viewpoint of polymerization characteristics, easy availability, and obtainment of a polymer that satisfies the requirements described above.

[Formula 3]

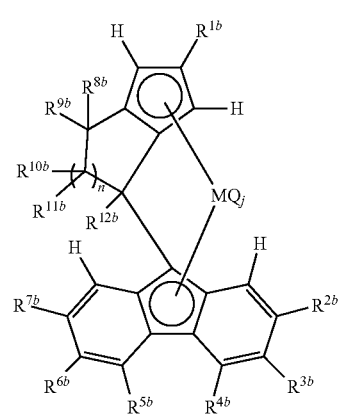

[A3]

In the formula [A3], $R^{1b}$ is a hydrocarbon group, a silicon-containing group or a halogen-containing hydrocarbon group; $R^{2b}$ to $R^{12b}$ may be the same as or different from each other and are each selected from a hydrogen atom, a hydrocarbon group, a silicon-containing group, a halogen atom and a halogen-containing hydrocarbon group; each of these substituents may be bonded to another substituent to form a ring; M is a transition metal of group 4 of the periodic table; n is an integer of 1 to 3; Q is selected in the same or different combination from a halogen atom, a hydrocarbon group, a neutral conjugated or unconjugated diene having 10 or less carbon atoms, an anion ligand and a neutral ligand capable of being coordinated as a lone electron pair; and j is an integer of 1 to 4.

<$R^1$ to $R^{10}$ and $R^{1b}$ to $R^{12b}$>

Examples of the hydrocarbon group for $R^1$ to $R^{10}$ and $R^{1b}$ to $R^{12b}$ include linear hydrocarbon groups, branched hydrocarbon groups, cyclic saturated hydrocarbon groups, cyclic unsaturated hydrocarbon groups, and groups in which 1 or 2 or more hydrogen atoms carried by a saturated hydrocarbon group are replaced with cyclic unsaturated hydrocarbon group(s). The number of carbon atoms of the hydrocarbon group is usually 1 to 20, preferably 1 to 15, more preferably 1 to 10.

Examples of the linear hydrocarbon group include: linear alkyl groups such as a methyl group, an ethyl group, a n-propyl group, a n-butyl group, a n-pentyl group, a n-hexyl group, a n-heptyl group, a n-octyl group, a n-nonyl group, and a n-decanyl group; and linear alkenyl groups such as an allyl group.

Examples of the branched hydrocarbon group include branched alkyl groups such as an isopropyl group, a tert-butyl group, a tert-amyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group, and a 1-methyl-1-isopropyl-2-methylpropyl group.

Examples of the cyclic saturated hydrocarbon group include: cycloalkyl groups such as a cyclopentyl group, a cyclohexyl group, a cycloheptyl group, a cyclooctyl group, and a methylcyclohexyl group; and polycyclic groups such as a norbornyl group, an adamantyl group, and a methyladamantyl group.

Examples of the cyclic unsaturated hydrocarbon group include: aryl groups such as a phenyl group, a tolyl group, a naphthyl group, a biphenyl group, a phenanthryl group, and an anthracenyl group; cycloalkenyl groups such as a cyclohexenyl group; and polycyclic unsaturated alicyclic groups such as a 5-bicyclo[2.2.1]hept-2-enyl group.

Examples of the group in which 1 or 2 or more hydrogen atoms carried by a saturated hydrocarbon group are replaced with cyclic unsaturated hydrocarbon group(s) include groups in which 1 or 2 or more hydrogen atoms carried by an alkyl group are replaced with aryl group(s), such as a benzyl group, a cumyl group, a 1,1-diphenylethyl group, and a triphenylmethyl group.

Examples of the silicon-containing group for $R^1$ to $R^{10}$ and $R^{1b}$ to $R^{12b}$ include groups represented by the formula —$SiR_3$ (wherein each of a plurality of R is independently an alkyl group having 1 to 15 carbon atoms or a phenyl group), such as a trimethylsilyl group, a triethylsilyl group, a dimethylphenylsilyl group, a diphenylmethylsilyl group, and a triphenylsilyl group.

Examples of the halogen-containing hydrocarbon group for $R^1$ to $R^{10}$ and $R^{1b}$ to $R^{12b}$ include groups in which 1 or 2 or more hydrogen atoms carried by the hydrocarbon group described above are replaced with halogen atom(s), such as a trifluoromethyl group.

Examples of the halogen atom for $R^2$ to $R^{10}$ and $R^{2b}$ to $R^{12b}$ include a fluorine atom, a chlorine atom, a bromine atom, and an iodine atom.

Among the substituents $R^2$ to $R^{10}$ and $R^{2b}$ to $R^{12b}$, two substituents (e.g., $R^{2b}$ and $R^{3b}$, $R^{3b}$ and $R^{4b}$, $R^{5b}$ and $R^{6b}$, $R^{6b}$ and $R^{7b}$, $R^{8b}$ and $R^{9b}$, $R^{9b}$ and $R^{10b}$, $R^{10b}$ and $R^{11b}$, or $R^{11b}$ and $R^{12b}$) may be bonded to each other to form a ring, and the ring formation may occur at two or more positions in the molecule.

In the present invention, examples of the ring (spiro ring or additional ring) formed through the bonding between two substituents include alicyclic rings and aromatic rings. Specific examples thereof include a cyclohexane ring, a benzene ring, a benzene hydride ring, and a cyclopentene ring. A cyclohexane ring, a benzene ring and a benzene hydride ring are preferred. Such a ring structure may further have a substituent such as an alkyl group on the ring.

$R^{1b}$ is preferably a hydrocarbon group, more preferably a hydrocarbon group having 1 to 20 carbon atoms, further preferably not an aryl group, especially preferably a linear hydrocarbon group, a branched hydrocarbon group or a cyclic saturated hydrocarbon group, particularly preferably a substituent having tertiary carbon as carbon having a free valency (carbon bonded to the cyclopentadienyl ring), from the viewpoint of stereoregularity.

Specific examples of $R^{1b}$ can include a methyl group, an ethyl group, an isopropyl group, a tert-butyl group, a tert-pentyl group, a tert-amyl group, a 1-methylcyclohexyl group, and a 1-adamantyl group. A substituent having tertiary carbon as carbon having a free valency such as a tert-butyl group, a tert-pentyl group, a 1-methylcyclohexyl group, or a 1-adamantyl group is more preferred, and a tert-butyl group and a 1-adamantyl group are particularly preferred.

In the general formula [A3], the fluorene ring moiety is not particularly limited as long as the structure is obtained from a fluorene derivative known in the art. Each of $R^{4b}$ and $R^{5b}$ is preferably a hydrogen atom from the viewpoint of stereoregularity and a molecular weight.

Each of $R^{2b}$, $R^{3b}$, $R^{6b}$ and $R^{7b}$ is preferably a hydrogen atom or a hydrocarbon group, more preferably a hydrocarbon group, further preferably a hydrocarbon group having 1 to 20 carbon atoms. Alternatively, $R^{2b}$ and $R^{3b}$ may be bonded to each other to form a ring, and $R^{6b}$ and $R^{7b}$ may be bonded to each other to form a ring. Examples of such a substituted fluorenyl group include a benzofluorenyl group, a dibenzofluorenyl group, an octahydrodibenzofluorenyl group, a 1,1,4,4,7,7,10,10-octamethyl-2,3,4,7,8,9,10,12-octahydro-1H-dibenzo[b,h]fluorenyl group, a 1,1,3,3,6,6,8,8-octamethyl-2,3,6,7,8,10-hexahydro-1H-dicyclopenta[b,h]fluorenyl group, and a 1',1',3',6',8',8'-hexamethyl-1'H,8'H-dicyclopenta[b,h]fluorenyl group. A 1,1,4,4,7,7,10,10-octamethyl-2,3,4,7,8,9,10,12-octahydro-1H-dibenzo[b,h]fluorenyl group is particularly preferred.

$R^{8b}$ is preferably a hydrogen atom.

$R^{9b}$ is more preferably a hydrocarbon group. $R^{9b}$ is further preferably an alkyl group having 2 or more carbon atoms such as a linear alkyl group or a branched alkyl group, a cycloalkyl group or a cycloalkenyl group. $R^{9b}$ is especially preferably an alkyl group having 2 or more carbon atoms. Each of $R^{10b}$ and $R^{11b}$ is also preferably a hydrogen atom from the viewpoint of synthesis.

Alternatively, in the case of n=1, $R^{9b}$ and $R^{10b}$ are more preferably bonded to each other to form a ring. Particularly preferably, the ring is a 6-membered ring such as a cyclohexane ring. In this case, $R^{11b}$ is preferably a hydrogen atom.

$R^{12b}$ is preferably a hydrocarbon group, particularly preferably an alkyl group.

<M, Q, n and j>

M is a transition metal of group 4 of the periodic table and is, for example, Ti, Zr or Hf, preferably Zr or Hf, particularly preferably Zr.

Q represents a halogen atom, a hydrocarbon group, a neutral conjugated or unconjugated diene having 10 or less carbon atoms, an anion ligand or a neutral ligand capable of being coordinated as a lone electron pair.

Examples of the halogen atom for Q include fluorine, chlorine, bromine, and iodine.

The hydrocarbon group for Q is preferably an alkyl group having 1 to 10 carbon atoms or a cycloalkyl group having 3 to 10 carbon atoms. Examples of the alkyl group having 1 to 10 carbon atoms include a methyl group, an ethyl group, a n-propyl group, an iso-propyl group, a 2-methylpropyl group, a 1,1-dimethylpropyl group, a 2,2-dimethylpropyl group, a 1,1-diethylpropyl group, a 1-ethyl-1-methylpropyl group, a 1,1,2,2-tetramethylpropyl group, a sec-butyl group, a tert-butyl group, a 1,1-dimethylbutyl group, a 1,1,3-trimethylbutyl group, and a neopentyl group. Examples of the cycloalkyl group having 3 to 10 carbon atoms include a cyclohexylmethyl group, a cyclohexyl group, and a 1-methyl-1-cyclohexyl group. The number of carbon atoms of the hydrocarbon group is more preferably 5 or less.

Examples of the neutral conjugated or unconjugated diene having 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Examples of the anion ligand include: alkoxy groups such as methoxy and tert-butoxy; aryloxy groups such as phenoxy; carboxylate groups such as acetate and benzoate; and sulfonate groups such as mesylate and tosylate.

Examples of the neutral ligand capable of being coordinated as a lone electron pair include: organophosphorus compounds such as trimethylphosphine, triethylphosphine, triphenylphosphine, and diphenylmethylphosphine; and ethers such as tetrahydrofuran (THF), diethyl ether, dioxane, and 1,2-dimethoxyethane.

In a preferred aspect, Q is a halogen atom or an alkyl group having 1 to 5 carbon atoms.

n is an integer of 1 to 3, preferably 1 or 2, more preferably 1. The value described above as n is preferred from the viewpoint of efficiently obtaining a product polymer.

j is an integer of 1 to 4, preferably 2.

Preferred aspects are described above about the configuration of the bridged metallocene compound represented by the general formula [A2] or [A3], i.e., $R^1$ to $R^{10}$, $R^{1b}$ to $R^{12b}$, M, n, Q and j. In the present invention, arbitrary combinations of respective preferred aspects are also included in the preferred aspects. Such a bridged metallocene compound can be suitably used for obtaining the polymer of the present invention having the physical properties described above.

The bridged metallocene compound represented by the general formula [A3] is particularly preferably (8-octamethylfluoren-12'-yl-(2-(adamantan-1-yl)-8-methyl-3,3b,4,5,6,7,7a,8-octahydrocyclopenta[a]indene))zirconium dichloride or (8-(2,3,6,7-tetramethylfluoren)-12'-yl-(2-(adamantan-1-yl)-8-methyl-3,3b,4,5,6,7,7a,8-octahydrocyclopenta[a]indene))zirconium dichloride. In this context, the octamethylfluorene refers to 1,1,4,4,7,7,10,10-octamethyl-2,3,4,7,8,9,10,12-octahydro-1H-dibenzo[b,h]fluorene.

<Compound (B)>

The catalyst for olefin polymerization preferably contains at least one compound selected from
(B-1) an organometal compound,
(B-2) an organoaluminumoxy compound, and
(B-3) a compound that forms an ionic pair through reaction with the component (A)
(hereinafter, also referred to as a "compound (B)").

Specific examples of the compound (B) and a support (C) and an organic compound component (D) mentioned later are as disclosed in Patent Literatures 3 and 4 or International Publication No. WO 2014-123212. Examples disclosed in International Publication No. WO 2010-055652, International Publication No. WO 2011-142400, International Publication No. WO 2013-146337, and Japanese Patent Laid-Open No. 2015-74645 are further applicable to the support (C).

<Support (C)>

The catalyst for olefin polymerization more preferably further contains a support (C).

Examples of the support (C) include inorganic or organic compounds which are solids in the form of granules or fine particles. The transition metal compound (A) is preferably used in a form supported by the support (C).

<Organic Compound Component (D)>

The catalyst for olefin polymerization of the present invention may further contain (D) an organic compound component, if necessary. The organic compound component (D) is used, if necessary, for the purpose of improving polymerization performance and the physical properties of a product polymer. Examples of the organic compound component (D) include alcohols, phenolic compounds, carboxylic acids, phosphorus compounds, amides, polyethers and sulfonates.

<Methods for Adjusting Ratio (Mz/Mw) and Ratio (Mw/Mn)>

The ratio (Mz/Mw) and the ratio (Mw/Mn) of the 4-methyl-1-pentene polymer (X) can be adjusted by blending a plurality of polymers differing in molecular weight during or after polymerization in a single-stage or multiple-stage (e.g., two-stage) polymerization method.

The ratios (Mz/Mw) and (Mw/Mn) were adjusted to arbitrary values by adding hydrogen in divided portions "at the initial stage of polymerization" and "during polymer production" in Examples 1 and 2 of the present invention, in spite of single-stage polymerization, and may be adjusted by such a method. More specifically, the ratios (Mz/Mw) and (Mw/Mn) of the polymer to be finally obtained can be adjusted by adding a small amount of hydrogen at the initial stage of polymerization to produce a high-molecular-weight polymer and feeding a larger amount of hydrogen at a polymerization stage advanced to some extent to produce a relatively low-molecular-weight polymer.

<Resin Composition Comprising 4-Methyl-1-Pentene Polymer (X)>

The resin composition comprising the 4-methyl-1-pentene polymer (X) according to the present invention comprises the 4-methyl-1-pentene polymer (X) as an essential constituent and additionally comprises various components according to the purpose of the molded article according to the present invention.

[Various Components Other than 4-Methyl-1-Pentene Polymer (X)]

The resin composition comprising the 4-methyl-1-pentene polymer (X) can optionally contain an additional resin or polymer, an additive for resins, etc., without inhibiting the effect of the present invention, according to its purpose.

A thermoplastic resin (E) given below can be widely used as the additional resin or polymer to be added. The amount of the resin or the polymer added is preferably 0.1 to 30% by mass with respect to the total mass of the resin composition.

The thermoplastic resin (E) is not particularly limited as long as the thermoplastic resin (E) is different from the 4-methyl-1-pentene polymer (X) according to the present invention. Examples thereof include the following resins:

thermoplastic polyolefin resins, for example, low-density, medium-density, or high-density polyethylene, high-pressure low-density polyethylene, isotactic polypropylene, syndiotactic polypropylene, poly-1-butene, poly-4-methyl-1-pentene, poly-3-methyl-1-pentene, poly-3-methyl-1-butene, ethylene-α-olefin copolymers, propylene-α-olefin copolymers, 1-butene-α-olefin copolymers, 4-methyl-1-pentene-α-olefin copolymers, cyclic olefin copolymers, chlorinated polyolefin, and modified polyolefin resins prepared by modifying these olefin resins;

thermoplastic polyamide resins, for example, aliphatic polyamides (nylon 6, nylon 11, nylon 12, nylon 66, nylon 610, and nylon 612);

thermoplastic polyester resins, for example, polyethylene terephthalate, polybutylene terephthalate, and polyester elastomers;

thermoplastic vinyl aromatic resins, for example, polystyrene, ABS resin, AS resin, and styrene elastomers (styrene-butadiene-styrene block polymers, styrene-isoprene-styrene block polymers, styrene-isobutylene-styrene block polymers, and hydrogenated products thereof);

thermoplastic polyurethane; vinyl chloride resin; vinylidene chloride resin; acrylic resin; ethylene-vinyl acetate copolymers; ethylene-methacrylic acid-acrylate copolymers; ionomers; ethylene-vinyl alcohol copolymers; polyvinyl alcohol; fluorinated resins; polycarbonate; polyacetal; polyphenylene oxide; polyphenylene sulfide polyimide; polyarylate; polysulfone; polyethersulfone; rosin resins; terpene resins; petroleum resins; and copolymer rubbers, for example, ethylene-α-olefin-diene copolymers, propylene-α-olefin-diene copolymers, 1-butene-α-olefin-diene copolymers, polybutadiene rubber, polyisoprene rubber, neoprene rubber, nitrile rubber, butyl rubber, polyisobutylene rubber, natural rubber, and silicone rubber.

Examples of the polypropylene include isotactic polypropylene and syndiotactic polypropylene. The isotactic polypropylene may be homopolypropylene, may be a propylene-C2-20 α-olefin (except for propylene) random copolymer, or may be a propylene block copolymer.

The poly-4-methyl-1-pentene and the 4-methyl-1-pentene-α-olefin copolymer are polymers different from the 4-methyl-1-pentene polymer (X) and are a homopolymer of 4-methyl-1-pentene or a 4-methyl-1-pentene-α-olefin random copolymer. For the 4-methyl-1-pentene-α-olefin random copolymer, examples of the α-olefin to be copolymerized with 4-methyl-1-pentene include α-olefins having 2 to 20 carbon atoms, preferably 6 to 20 carbon atoms, such as ethylene, propylene, 1-butene, 1-hexene, 1-octene, 1-decene, 1-dodecene, 1-tetradecene, 1-hexadecene, 1-octadecene, and 1-eicosene. These can be used alone or in combination of two or more thereof. The melt flow rate (MFR; ASTM D1238, 260° C., a 5.0 kg load) is preferably 0.1 to 200 g/10 min, more preferably 1 to 150 g/10 min. A commercially available product may be used as the poly-4-methyl-1-pentene. Examples thereof include TPX (brand name) manufactured by Mitsui Chemicals, Inc. Poly-4-methyl-1-pentene from any of other manufacturers can also be preferably used as long as the requirements described above are satisfied.

Low-density polyethylene, medium-density polyethylene, high-density polyethylene, or high-pressure low-density polyethylene produced by a conventional approach known in the art can be used as the polyethylene.

Examples of the polybutene can include homopolymers of 1-butene and copolymers of 1-butene and olefins except for 1-butene. Examples of the olefin to be copolymerized with polybutene include the α-olefins listed as the α-olefin to be copolymerized with 4-methyl-1-pentene. These olefins are used alone or as a mixture of two or more thereof. Examples of the copolymer include 1-butene-ethylene random copolymers, 1-butene-propylene random copolymers, 1-butene-methylpentene copolymers, 1-butene-methylbutene copolymers, and 1-butene-propylene-ethylene copolymers. In such a copolymer, the content of a constitutional unit derived from 1-butene is preferably 50% by mol or more, more preferably 70% by mol or more, particularly preferably 85% or more, from the viewpoint of heat resistance.

The modified polyolefin resin can be obtained by graft-modifying the polyolefin resin mentioned above with an ethylenic unsaturated bond-containing monomer using an organic peroxide. Examples of the type of the functional group carried by the modified polyolefin include a halogen atom, a carboxyl group, an acid anhydride group, an epoxy group, a hydroxy group, an amino group, an amide group, an imide group, an ester group, an alkoxysilane group, an acid halide group and a nitrile group.

Examples of the rosin resin include natural rosin, polymerized rosin, modified rosin prepared by modification with maleic acid, fumaric acid, (meth)acrylic acid, or the like, and rosin derivatives. Examples of this rosin derivative include esterified products of the natural rosin, the polymerized rosin or the modified rosin described above, phenol-modified products thereof and their esterified products. Further examples thereof can also include hydrogenated products thereof.

Examples of the terpene resin include resins consisting of α-pinene, β-pinene, limonene, dipentene, terpene phenol, terpene alcohol, or terpene aldehyde and also include aromatic modified terpene resins prepared by polymerizing an aromatic monomer such as styrene with α-pinene, β-pinene, limonene, dipentene, or the like. Further examples thereof can also include hydrogenated products thereof.

Examples of the petroleum resin include aliphatic petroleum resins with a C5 fraction of tar naphtha as a main raw material, aromatic petroleum resins with a C9 fraction thereof as a main raw material and copolymerized petroleum resins thereof. Specific examples thereof include C5 petroleum resin (resin prepared by polymerizing a C5 fraction of cracked naphtha), C9 petroleum resin (resin prepared by polymerizing a C9 fraction of cracked naphtha), and C5-C9 copolymerized petroleum resin (resin prepared by copolymerizing C5 and C9 fractions of cracked naphtha). Further examples thereof also include coumarone indene resins containing styrenes, indenes, coumarone, and dicyclopentadiene, etc. of tar naphtha fractions, alkylphenol resins typified by condensates of p-tertiary butylphenol and acetylene, and xylene resins prepared by reacting o-xylene, p-xylene or m-xylene with formalin.

One or more resin(s) selected from the group consisting of a rosin resin, a terpene resin and a petroleum resin is preferably a hydrogenated derivative because of excellent weather resistance and resistance to discoloration. The softening point of the resin in a ring-and-ball method preferably falls within the range of 40 to 180° C. The number-average molecular weight (Mn) of the resin measured by GPC preferably falls within the range of approximately 100 to 10,000. Commercially available products may be used as the rosin resin, the terpene resin and the petroleum resin.

The thermoplastic resin (E) is preferably low-density, medium-density, or high-density polyethylene, high-pressure low-density polyethylene, isotactic polypropylene, syndiotactic polypropylene, poly-1-butene, poly-4-methyl-1-pentene, poly-3-methyl-1-pentene, poly-3-methyl-1-butene, an ethylene-α-olefin copolymer, a propylene-α-olefin copolymer, a 1-butene-α-olefin copolymer, a styrene elastomer, a vinyl acetate copolymer, an ethylene-methacrylic acid-acrylate copolymer, an ionomer, a fluorinated resin, a rosin resin, a terpene resin or a petroleum resin, more preferably polyethylene, isotactic polypropylene, syndiotactic polypropylene, poly-1-butene, an ethylene-α-olefin copolymer, a propylene-α-olefin copolymer, a 1-butene-α-olefin copolymer, a vinyl acetate copolymer, a styrene elastomer, a rosin resin, a terpene resin or a petroleum resin from the viewpoint of improvement in heat resistance, improvement in cold resistance, and flexibility.

Examples of the thermoplastic resin (E) preferably include poly-3-methyl-1-pentene and poly-3-methyl-1-butene. These contribute to improvement in the rigidity of the resulting film, etc. by working as a nucleating agent of the 4-methyl-1-pentene polymer (X) of the present invention.

One of the thermoplastic resins described above may be used alone as the thermoplastic resin (E), or two or more thereof may be used in combination.

Examples of the additive for resins include nucleating agents, antiblocking agents, pigments, dyes, fillers, lubricants, plasticizers, mold release agents, antioxidants, flame retardants, ultraviolet absorbers, antimicrobial agents, surfactants, antistatic agents, weathering stabilizers, heat stabilizers, anti-slip agents, foaming agents, crystallization aids, anti-fogging agents, (transparent) nucleating agents, antiaging agents, hydrochloric acid absorbers, impact modifiers, cross-linking agents, co-cross-linking agents, cross-linking aids, pressure-sensitive adhesives, softening agents, and processing aids. These additives can be used alone or in appropriate combination of two or more thereof.

A nucleating agent known in the art can be used as the nucleating agent for further improving the moldability of the 4-methyl-1-pentene polymer (X), i.e., increasing the crystallization temperature and increasing the crystallization rate. Specific examples thereof include dibenzylidene sorbitol nucleating agents, phosphoric acid ester salt nucleating agents, rosin nucleating agents, benzoic acid metal salt nucleating agents, fluorinated polyethylene, sodium 2,2-methylenebis(4,6-di-t-butylphenyl)phosphate, pimelic acid and salts thereof, and 2,6-naphthalenedicarboxylic acid dicyclohexylamide. The amount of the nucleating agent added is not particularly limited and is preferably 0.1 to 1 parts by mass with respect to 100 parts by mass of the 4-methyl-1-pentene polymer (X). The nucleating agent can be appropriately added, for example, during polymerization, after polymerization, or during molding.

An antiblocking agent known in the art can be used as the antiblocking agent. Specific examples thereof include fine silica powders, fine aluminum oxide powders, fine clay powders, powdery or liquid silicon resin, tetrafluoroethylene resin, and fine cross-linked resin powders, for example, cross-linked acrylic or methacrylic resin powders. Among them, a fine silica powder and a cross-linked acrylic or methacrylic resin powder are preferred.

Examples of the pigment include inorganic pigments (titanium oxide, iron oxide, chromium oxide, cadmium sulfide, etc.) and organic pigments (azolake pigments, thioindigo pigments, phthalocyanine pigments and anthraquinone pigments). Examples of the dye include azo dyes, anthraquinone dyes, and triphenylmethane dyes. The amounts of the pigment and the dye added are not particularly limited, and the total amount thereof is usually 5% by mass or less, preferably 0.1 to 3% by mass, with respect to the total mass of the resin composition comprising the 4-methyl-1-pentene polymer.

Examples of the filler include glass fiber, carbon fiber, silica fiber, metal (stainless, aluminum, titanium, copper, etc.) fiber, carbon black, silica, glass beads, silicates (calcium silicate, talc, clay, etc.), metal oxides (iron oxide, titanium oxide, alumina, etc.), carbonates of metals (calcium sulfate, barium sulfate), various metal (magnesium, silicon, aluminum, titanium, copper, etc.) powders, mica, and glass flake. These fillers may be used alone or in combination of two or more thereof.

Examples of the lubricant include waxes (carnauba wax, etc.), higher fatty acids (stearic acid, etc.), higher alcohols (stearyl alcohol, etc.), and higher fatty acid amides (stearic acid amide, etc.).

Examples of the plasticizer include aromatic carboxylic acid esters (dibutyl phthalate, etc.), aliphatic carboxylic acid esters (methyl acetyl ricinoleate, etc.), aliphatic dicarboxylic acid esters (adipic acid-propylene glycol polyester, etc.), aliphatic tricarboxylic acid esters (triethyl citrate, etc.), phosphoric acid triesters (triphenyl phosphate, etc.), epoxy fatty acid esters (epoxy butyl stearate, etc.), and petroleum resins.

Examples of the mold release agents include lower (C1 to C4) alcohol esters of higher fatty acids (butyl stearate, etc.), polyhydric alcohol esters of fatty acids (C4 to C30) (hydrogenated castor oil, etc.), glycol esters of fatty acids, and liquid paraffin.

An antioxidant known in the art can be used as the antioxidant. Specific examples thereof include phenol antioxidants (2,6-di-t-butyl-4-methylphenol, etc.), polycyclic phenol antioxidants (2,2'-methylenebis(4-methyl-6-t-butylphenol), etc.), phosphorus antioxidants (tetrakis(2,4-di-t-butylphenyl)-4,4-biphenylene diphosphonate, etc.), sulfur antioxidants (dilauryl thiodipropionate, etc.), amine antioxidants (N,N-diisopropyl-p-phenylenediamine, etc.), and lactone antioxidants. Plural types thereof may be used in combination.

Examples of the flame retardant include organic flame retardants (nitrogen-containing flame retardants, sulfur-containing flame retardants, silicon-containing flame retardants, phosphorus-containing flame retardants, etc.) and inorganic flame retardants (antimony trioxide, magnesium hydroxide, zinc borate, red phosphorus, etc.).

Examples of the ultraviolet absorber include benzotriazole ultraviolet absorbers, benzophenone ultraviolet absorbers, salicylic acid ultraviolet absorbers, and acrylate ultraviolet absorbers.

Examples of the antimicrobial agent include quaternary ammonium salts, pyridine compounds, organic acids, organic acid esters, halogenated phenol, and organic iodine.

Examples of the surfactant can include nonionic, anionic, cationic and amphoteric surfactants. Examples of the nonionic surfactant include: polyethylene glycol-type nonionic surfactants such as higher alcohol ethylene oxide adducts, fatty acid ethylene oxide adducts, higher alkylamine ethylene oxide adducts, and polypropylene glycol ethylene oxide adducts; and polyhydric alcohol-type nonionic surfactants such as polyethylene oxide, fatty acid esters of glycerin, fatty acid esters of pentaerythritol, fatty acid esters of sorbitol or sorbitan, alkyl ethers of polyhydric alcohols, and aliphatic amides of alkanolamines. Examples of the anionic surfactant include: sulfuric acid ester salts such as alkali metal salts of higher fatty acids; sulfonates such as alkylbenzenesulfonates, alkylsulfonates, and paraffin sulfonate; and phosphoric acid ester salts such as higher alcohol phosphoric acid ester salt. Examples of the cationic surfactant include quaternary ammonium salts such as alkyltrimethylammonium salts. Examples of the amphoteric surfactant include: amino acid-type amphoteric surfactants such as higher alkylaminopropionates; and betaine-type amphoteric surfactants such as higher alkyl dimethyl betaine and higher alkyl dihydroxyethyl betaine.

Examples of the antistatic agent include the surfactants described above, fatty acid esters, and polymer-type antistatic agents. Examples of the fatty acid ester include esters of stearic acid and oleic acid. Examples of the polymer-type antistatic agent include polyether ester amide.

The amounts of these various additives (filler, lubricant, plasticizer, mold release agent, antioxidant, flame retardant, ultraviolet absorber, antimicrobial agent, surfactant, antistatic agent, etc.) added are not particularly limited and are each preferably 0.1 to 30% by mass with respect to the total mass of the resin composition comprising the 4-methyl-1-pentene polymer (X), without impairing the object of the present invention, according to a purpose.

<Method for Producing Resin Composition Comprising 4-methyl-1-pentene Polymer (X)>

The method for producing the resin composition comprising the 4-methyl-1-pentene polymer (X) according to the present invention is not particularly limited, and, for example, the 4-methyl-1-pentene polymer (X) and other components are mixed at the ratios of addition mentioned above and then melt-kneaded to obtain the resin composition.

The melt kneading is not particularly limited by its method and can be performed using a generally commercially available melt kneading apparatus such as an extruder.

For example, the cylinder temperature of a site where kneading is performed in a kneading machine is usually 220 to 320° C., preferably 250 to 300° C. If the cylinder temperature is lower than 220° C., kneading is insufficient due to insufficient melting so that the physical properties of the resin composition are less likely to be improved. On the other hand, if the temperature is higher than 320° C., the thermal decomposition of the 4-methyl-1-pentene polymer (X) may occur. The kneading time is usually 0.1 to 30 minutes, particularly preferably 0.5 to 5 minutes. If the kneading time is shorter than 0.1 minutes, sufficient melt kneading is not performed. If the kneading time exceeds 30 minutes, the thermal decomposition of the 4-methyl-1-pentene polymer (X) may occur.

<Molded Article>

The resin composition is molded to obtain a molded article.

(1) Molding Method

Various molding methods known in the art can be applied to the method for molding the resin composition. Examples thereof can include various molding methods such as injection molding, extrusion molding, injection stretch blow molding, blow molding, cast molding, calender molding, press molding, stamping molding, inflation molding, and roll molding. The resin composition can be processed into the molded article of interest, for example, a film, a sheet, a hollow molded article, an injection molded article, fiber, or the like by these molding methods. The molding conditions are similar to molding conditions for conventional 4-methyl-1-pentene polymers known in the art.

(2) Shape

The shape of the molded article is not particularly limited. Examples thereof include tube, film, sheet, membrane, tape, plate, rod, fiber, and nonwoven fabric shapes.

White turbidity ascribable to steam sterilization tends to be more conspicuous in a molded article having a larger thickness. Also, the improving effect according to the present invention may not sufficiently suppress white turbidity in a molded article having a thick site. From such a viewpoint, the thickness of a site having the minimum thickness of the molded article is preferably 0.001 mm or larger, more preferably 0.01 mm or larger, further preferably 0.05 mm or larger, and the thickness of a site having the maximum thickness of the molded article is preferably 100 mm or smaller, more preferably 50 mm or smaller, further preferably 6 mm or smaller, still further preferably 3 mm or smaller. In this context, the (maximum or minimum) thickness refers to the inter-plate distance of a massive molded article sandwiched parallel plates, the thickness of a tube-, film-, sheet-, membrane-, tape-, or plate-shaped molded article, or the diameter of a rod- or fiber-shaped molded article. When the molded article has a thickness distribution, the largest value is referred to as the thickness of a site having the maximum thickness, and the smallest value is referred to as the thickness of a site having the minimum thickness. Examples of the method for measuring the thickness include a method of measuring the cross section of the molded article using a caliper.

Hereinafter, the film is a generic name for planar molded articles and also conceptually includes sheets, tapes, and the like.

(3) Purpose

The molded article of the present invention can be used for purposes that may employ conventional 4-methyl-1-pentene polymers, without limitations, and is more suitable for purposes that require heat resistance or stain resistance. Also, the molded article of the present invention can be used for purposes involving a sterilization step using water vapor or as a molded article that is obtained through a sterilization step using water vapor, because of the effect of suppressing white turbidity ascribable to steam sterilization, which is a feature of the present invention. More specifically, the purposes include medical instruments, medical packaging materials, experimental equipment, cosmetic containers, infant goods, food containers, and containers and equipment for microwave oven steam sterilization.

Film elongation is required for characteristics in film formation. Purposes of the film are not limited. Examples of the purposes of the film include packaging materials for food, meat, processed fish, vegetables, fruits, fermented food, retort food, confectionery, medicines, flower bulbs, seeds, mushrooms, and the like, wrap films, cell culture bags, cell inspection films, heat-resistant vacuum molded containers, prepared food containers, lid materials for prepared food, baking cartons, and various mold releasing films.

Examples of the purposes of the molded article according to the present invention will be listed below, but are not particularly limited thereto.

Examples of containers include: food containers and bottle containers, such as eating utensils, seasoning containers, kitchen goods, retort containers, freeze preservation containers, retort pouches, microwave oven heat-resistant containers, frozen food containers, chilled sweet cups, cups, nursing bottles, and beverage bottles; blood transfusion sets, medical bottles, medical containers, medical hollow bottles, medical bags, transfusion bags, blood preservation bags, transfusion bottles, chemical containers, detergent containers, containers for fabric softeners, containers for bleaches, containers for shampoos, containers for rinses, cosmetics containers, perfume containers, toner containers, powder containers, containers for adhesives, containers for gasoline tanks, containers for kerosene, food containers, heat-resistant containers, medical containers, animal cages, and physicochemical experimental instruments.

Examples of packaging materials include food packaging materials, meat packaging materials, processed fish packaging materials, vegetable packaging materials, fruit packaging materials, fermented food packaging materials, confectionery packaging materials, oxygen absorber packaging materials, packaging materials for retort food, freshness keeping films, medicine packaging materials, cell culture bags, cell inspection films, flower bulb, packaging materials, seed packaging materials, films for vegetable or mushroom cultivation, heat-resistant vacuum molded containers, prepared food containers, lid materials for prepared food, industrial wrap films, household wrap films, and baking cartons.

Examples of films other than those described above include: mold releasing films such as mold releasing films for flexible printed circuit boards, mold releasing films for ACM substrates, mold releasing films for rigid substrates, mold releasing films for rigid flexible printed circuit boards, mold releasing films for advanced composite materials, mold releasing films for carbon fiber composite material curing, mold releasing films for glass fiber composite material curing, mold releasing films for aramid fiber composite material curing, mold releasing films for nanocomposite material curing, mold releasing films for filler curing, mold releasing films for semiconductor encapsulation, mold releasing films for polarizing plates, mold releasing films for diffusion sheets, mold releasing films for prism sheets, mold releasing films for reflection sheets, cushion films for mold releasing films, mold releasing films for fuel cells, mold releasing films for various rubber sheets, mold releasing films for urethane curing, and mold releasing films for epoxy curing; solar cell encapsulating sheets, solar cell back sheets, plastic films for solar cells, battery separators, separators for lithium ion cells, electrolyte membranes for fuel cells, and pressure-sensitive adhesive or adhesive separators, light guide plates, and optical disks; base materials, pressure-sensitive adhesive materials, and separators for semiconductor process films such as dicing tapes, back grind tapes, die bonding films, two-layer FCCL, and films for film condensers; pressure-sensitive adhesive films, stress relaxation films, films for pellicles, and films for polarizing plates; protecting films such as protecting films for polarizing plates, protecting films for liquid crystal panels, protecting films for optical components, protecting films for lenses, protecting films for electric components or electric appliances, protecting films for mobile phones, protecting films for personal computers, protecting films for touch panels, window glass protecting films, films for bake coating, masking films, films for condensers, capacitor films, tab lead films, capacitor films for fuel cells, reflection films, diffusion films, laminates (including glass), radiation-resistant films, γ ray-resistant films, and porous films; heat dissipation films or sheets, molds for electronic component encapsulant production, LED molds, laminate plates for high-frequency circuits, covering materials for high-frequency cables, optical waveguide substrates, glass fiber composites, carbon fiber composites, glass interlayers, films for safety glass, window films for building materials, arcade domes, gymnasium window glass substitutes, films for LCD substrates, bulletproof materials, films for bulletproof glass, heat shield sheets, and heat shield films; release paper such as release paper for synthetic leather, release paper for advanced composite materials, release paper for carbon fiber composite material curing, release paper for glass fiber composite material curing, release paper for aramid fiber composite material curing, release paper for nanocomposite material curing, and release paper for filler curing; and heat-resistant and water-resistant printing paper, films for packaging, mold releasing films, breathable films, reflection films, synthetic paper, films for displays, conductive films for displays, and display barrier films.

Examples of other purposes include: mandrels for rubber hose production, sheaths, sheaths for rubber hose production, hoses, tubes, release paper for synthetic leather, medical tubes, industrial tubes, cooling water piping, hot water piping, wire covering materials, millimeter-wave signal cable covering materials, high-frequency signal cable covering materials, eco-wire covering materials, in-vehicle cable covering materials, signal cable covering materials, insulators for high-voltage wires, wiring ducts, tubes for cosmetics or perfume sprays, medical tubes, transfusion tubes, pipes and wire harnesses; interior and exterior materials of automobiles, motorcycles, railroad vehicles, air planes, ships, etc.; abrasion-resistant automobile interior and exterior materials; automobile interior and exterior materials such as instrument panel skins, door trim skins, rear package trim skins, ceiling skins, rear pillar skins, seat back garnishes, console boxes, arm rests, air back case lid materials, shift knobs, assist grips, side step mats, meter covers, battery caps, fuses, automatic washing sensor components, ignitions, coil bobbins, bushings, bumpers, car heater fans, radiator grills, wheel covers, electric source connectors for EV, in-vehicle display polarizing plates, louvers, armrests, rail insulators, motorcycle windshields, reclining covers, sheets in trunks, seat belt buckles, moldings such as inner or outer moldings, bumper moldings, side moldings, roof moldings, and belt moldings, air spoilers, automobile seals such as door seals and body seals, glass run channels, mudguards, kicking plates, step mats, number plate housings, automobile hose members, air duct hoses, air duct covers, air intake pipes, air dam skirts, timing belt cover seals, hood cushions, door cushions, cup holders, side brake grips, shift knob covers, seat adjustment knobs, wire harness grommets, suspension cover boots, glass guides, inner belt line seals, roof guides, trunk lid seals, molded quarter window gaskets, corner moldings, glass encapsulation, hood seals, glass run channels, secondary seals, bumper components, body panels, side shields, door skins, weather strip materials, hoses, steering wheels, wire harness covers, and seat adjuster covers; special tires such as vibration damping tires, silent tires, car race tires, and radio control tires; packings, automobile dust covers, lamp seals, automobile boots, rack and pinion boots, timing belts, wire harnesses, grommets, emblems, air filter packings, automobile connectors, ignition coils, switches, lamp reflectors, relays, electric control unit cases, sensor housings, head lamps, meter plates, insulators, bearing retainers, thrust washers, lamp reflectors, door handles, grazing, panoramic roofs, solenoid valves, ECU cases, connectors for unit connection, alternators, terminal blocks for HEV, electromagnetic valves, and coil assembly components; skin materials for furniture, shoes, cloths, bags, building materials, and the like; seal materials for architecture, waterproof sheets, building material sheets, piping joints, dressing tables, bathroom ceilings, impellers, building material gaskets, window films for building materials, iron-core protecting members, sheets for foundation improvement, water stops, joint sealing materials, gaskets, doors, door frames, window frames, cornices, baseboards, opening frames, floor materials, ceiling materials, wall paper, health supplies (e.g., nonslip mats or sheets and tip-resistant films, mats, or sheets), health appliance components, impact absorbing pads, protectors or protecting equipment (e.g., helmets and guards), sport goods (e.g., sport grips and protectors), sport protecting equipment, rackets, mouth guards, balls, golf balls, and carrying implements (e.g., impact absorbing grips for carrying and impact absorbing sheets); impact absorbers such as vibration damping pallets, impact absorbing dampers, insulators, impact absorbers for shoes, impact absorbing foams, and impact absorbing films or sheets; grip materials (pens and pencils, industrial tools, sporting equipment, vehicle handles, commodities, electric instruments, furniture, etc.), camera bodies and components, office automation equipment components, copier structural parts, printer structural parts, members for air planes, in-flight meal trays, facsimile structural parts, pump components, electrical tool components, drying/washing machine components, heater pump nozzles or ports, IH rice cookers, rice cooker inner lid materials, microwave oven roller stay rings, vacuum cleaner fan guides, pump or filter cases for electric rice jars, garbage disposal components or tanks or heating and drying components, meters for milk, filter bowls, escalator components, ultrasonic motor housings, absolute encoders, small pump housings, television members, hair dryer housings, lighting covers, sundries, coffee drippers, humidifier components, iron components, tap water instrument components, drinking flasks, combs, fountain pens, pencil cases, pencil sharpeners, sport leisure goods, ski goggles, karate or kendo protective gears, fins for surfing, musical instruments, fish breeding tanks, sandals, snow shovels, fishing rod cases, toys, treads, shoe soles, shoe midsoles or inner soles, soles, sandals, chair skins, bags, school bags, wears such as jumpers and coats, bands, rods, ribbons, notebook covers, book covers, keyholders, pencases, wallets, chopsticks, China spoons, microwave cooking pans, business card holders, commuter pass holders, suckers, tooth blushes, floor materials, gymnastic mats, electrical tool components, agricultural equipment components, heat dissipation materials, transparent substrates, soundproof materials, acoustic absorbents, cushion materials, wire cables, shape memory materials, connectors, switches, plugs, home electronic components (motor components, housings, etc.), medical gaskets, speaker diaphragms, medical caps, drug caps, and gaskets; packing materials for use in high-temperature treatments such as boiling treatment and high-pressure steam sterilization after filling bottles with baby food, dairy products, drugs, sterilized water, or the like; industrial seal materials, industrial sewing machine tables, number plate housings, cap liners such as PET bottle cap liners, protecting film adhesive layers, pressure-sensitive adhesive materials such as hot melt adhesive materials, stationery, and office supplies; precision measuring equipment or office automation equipment supporting members such as office automation printer legs, facsimile legs, sewing machine legs, motor supporting mats, and audio vibration-proof materials; heat-resistant packings for office automation, animal cages, physicochemical experimental equipment such as beakers and measuring cylinders, medical films or sheets, films or sheets for cell culture, syringes, optical media such as CD, DVD and Blu-ray, cells for optical measurement, cloth cases, clear cases, clear files, clear sheets, and desk mats; purposes as fiber, for example, monofilaments, multifilaments, cut fiber, hollow fiber, nonwoven fabrics, stretchable nonwoven fabrics, fiber, waterproof fabrics, breathable woven fabrics and fabrics, disposable diapers, sanitary products, hygiene products, filters, bug filters, filters for dust collection, air cleaners, hollow fiber filters, water-purifying filters, filter fabrics, filter paper, gas separation membranes, artificial liver (cases and hollow fiber), filter reverse osmotic membranes, heart-lung machines, injection syringes, three-way cocks, transfusion sets, instruments for surgeons, flowmeters, dental instruments, instruments for contact lens sterilization, inhaling masks, cells for analysis, milking machines, fire alarm boxes, fire extinguishers, helmets, protecting glasses, IC carriers, pickup lenses, and burn-in sockets.

Further, the molded article of the present invention is also suitably used in coating materials, films and sheets obtained by coating, mold release materials, water-repellant materials, insulating films, adhesive materials, pressure-sensitive adhesive materials, coated paper, transparent sealants, sealants, hot melt-type pressure-sensitive adhesives or adhesives, solvent-type pressure-sensitive adhesives or adhesives, film-like pressure-sensitive adhesives or adhesives, fabric tapes, craft tapes, elastic adhesives, etc.

The 4-methyl-1-pentene polymer (X) may be processed into fine powders by crushing. The obtained fine powders can be used, for example, as an additive for ink compositions or coating compositions, as an additive for metallurgical powder compositions, as an additive for powder compositions for ceramic sintering, as an additive for pressure-sensitive adhesives, as an additive for rubbers, as a mold release agent for toner, or as a die mold release agent. Further, the obtained fine powders can also be used as a resin additive for shafts, gear wheels, cams, electric components, cameral components, automobile components, components intended for household goods, or as a resin additive for waxes, greases, engine oils, fine ceramics, plating, etc.

EXAMPLES

Next, the present invention will be described in detail with reference to Examples. However, the present invention is not limited by these Examples.

[Synthesis of Transition Metal Complex]

Synthesis of (8-octamethylfluoren-12'-yl-(2-(adamantan-1-yl)-8-methyl-3,3b,4,5,6,7,7a,8-octahydrocyclopenta[a]indene)) zirconium dichloride (catalyst A)

(1) Synthesis of 1-Adamantylcyclopentadienyl Lithium

In a nitrogen atmosphere, a 200 ml three-neck flask was charged with 40 ml of a tert-butyl methyl ether solution of ethyl magnesium bromide having a concentration of 1.0 M. While this solution was cooled in an ice bath, 2.64 g of cyclopentadiene was added dropwise thereto over 20 minutes. The mixture was brought back to room temperature and stirred for 17 hours to prepare solution A.

In a nitrogen atmosphere, a 500 ml three-neck flask was charged with 200 ml of diisopropyl ether and 0.36 g of copper(II) trifluoromethanesulfonate. To this solution, the preceding solution A prepared was added dropwise over 20 minutes in a water bath. A solution prepared by dissolving 4.30 g of 1-bromoadamantane in 40 mL of diisopropyl ether was added dropwise thereto, and the mixture was stirred at 70° C. for 10 hours. The reaction solution was cooled to room temperature, and then, 200 ml of a saturated aqueous solution of ammonium chloride was added thereto in a water bath. The organic layer was separated, and the aqueous layer was subjected to extraction with 200 ml of hexane. The hexane extracts and the preceding organic layer were combined, and the obtained organic solution was washed with water. This organic solution was dried over magnesium sulfate, and then, the solvent was distilled off. The obtained solid matter was purified using a silica gel column chromatograph to obtain 4.2 g of a crude product.

In a nitrogen atmosphere, a 100 ml Schlenk flask was charged with 4.2 g of the obtained crude product and 20 mL of hexane. To this solution, 13.8 mL of a hexane solution of 1.6 M n-butyl lithium was added dropwise over 20 minutes in an ice bath, and the mixture was brought back to room temperature and stirred for 17 hours. Precipitates were collected by filtration from this reaction solution and washed with hexane to obtain the target 1-adamantylcyclopentadienyl lithium. The yield was 2.70 g, and the % yield was 66%.

The target compound was identified from measurement results of $^1$H-NMR. The measurement results are as follows.

$^1$H-NMR (THF-d$_8$): δ 5.57-5.55 (2H, m), 5.52-5.50 (2H, m), 1.96 (3H, s), 1.87 (6H, s), 1.74 (6H, s).

(2) Synthesis of 2-(adamantan-1-yl)-8-methyl-3,3b,4,5,6,7,7a,8-octahydrocyclopenta[a]indene In a nitrogen atmosphere, a 100 ml three-neck flask was charged with 40 ml of THF and 1.57 g of magnesium chloride. To this solution, a solution obtained by dissolving 3.09 g of 1-adamantylcyclopentadienyl lithium in 10 ml of THF was added dropwise over 5 minutes, and the mixture was stirred at room temperature for 2 hours and further at 50° C. for 3 hours. A solution obtained by dissolving 1.96 g (15.75 mmol) of 1-acetylcyclohexene in 10 ml of THF was added dropwise thereto over 10 minutes in an ice/acetone bath, and the mixture was stirred at room temperature for 19 hours. 1.0 ml of acetic acid and 3.1 ml of pyrrolidine were charged thereinto in an ice/acetone bath, and the mixture was stirred at room temperature for 17 hours. To this solution, 30 ml of a saturated aqueous solution of ammonium chloride was added in an ice/acetone bath. To this solution, 100 ml of hexane was added. Then, the organic layer was separated, and the aqueous layer was subjected to extraction with 200 ml of hexane. The hexane extracts and the preceding organic layer were combined, and the obtained organic solution was washed twice with water. This organic solution was dried over magnesium sulfate, and then, the solvent was distilled off. The obtained solid matter was recrystallized from methanol to obtain the target 2-(adamantan-1-yl)-8-methyl-3,3b,4,5,6,7,7a,8-octahydrocyclopenta[a]indene. The yield was 2.134 g, and the % yield was 47%.

The target compound was identified from measurement results of $^1$H-NMR and GC-MS. The measurement results are as follows.

$^1$H-NMR (Toluene-d$_8$): δ6.06 (1H, s), 5.98 (1H, s), 2.88-2.78 (2H, m), 1.98-1.13 (26H, m).

GC-MS: m/Z=306 (M$^+$).

(3) Synthesis of 8-octamethylfluoren-12'-yl-(2-(adamantan-1-yl)-8-methyl-3,3b,4,5,6,7,7a,8-octahydrocyclopenta[a]indene)

In a nitrogen atmosphere, a 30 ml Schlenk flask was charged with 1.546 g of octamethylfluorene and 40 ml of tert-butyl methyl ether. To this solution, 2.62 ml of a hexane solution of 1.6 M n-butyl lithium was added dropwise over 15 minutes in an ice/acetone bath. The mixture was stirred for 22 hours while gradually brought back to room temperature. To this solution, 1.349 g of 2-(adamantan-1-yl)-8-methyl-3,3b,4,5,6,7,7a,8-octahydrocyclopenta[a]indene was added. The mixture was stirred at room temperature for 19 hours and further at 50° C. for 8 hours. Then, the reaction solution was added to 100 ml of a saturated aqueous solution of ammonium chloride. The organic layer was separated, and the aqueous layer was subjected to extraction with 100 ml of hexane. The hexane extracts and the preceding organic layer were combined, and the obtained organic solution was washed twice with water. This organic solution was dried over magnesium sulfate, and then, the solvent was distilled off. The obtained solid was washed with acetone to obtain the target 8-octamethylfluoren-12'-yl-(2-(adamantan-1-yl)-8-methyl-3,3b,4,5,6,7,7a,8-octahydrocyclopenta[a]indene). The yield was 1.51 g, and the % yield was 54%.

The target compound was identified from measurement results of FD-MS. The measurement results are as follows.

FD-MS: m/Z=693 (M$^+$).

The obtained 8-octamethylfluoren-12'-yl-(2-(adamantan-1-yl)-8-methyl-3,3b,4,5,6,7,7a,8-octahydrocyclopenta[a]indene) was confirmed from measurement results of $^1$H-NMR to be a mixture of a plurality of isomers.

(4) Synthesis of Transition Metal Complex (Catalyst A)

In a nitrogen atmosphere, a 100 ml Schlenk flask was charged with 1.039 g of 8-octamethylfluoren-12'-yl-(2-(adamantan-1-yl)-8-methyl-3,3b,4,5,6,7,7a,8-octahydrocyclopenta[a]indene), 0.47 ml of α-methylstyrene, 30 ml of hexane, and 2.62 ml of cyclopentyl methyl ether. To this solution, 2.18 ml of a hexane solution of 1.6 M n-butyl lithium was added dropwise over 10 minutes in an oil bath of 25° C. After stirring at 50° C. for 4 hours, precipitates were filtered and washed with hexane to obtain a pink powder. A 100 ml Schlenk flask was charged with this pink powder and 30 ml of diethyl ether. This solution was cooled in a dry ice/acetone bath. Then, to this solution, 0.385 g (1.65 mmol) of zirconium tetrachloride suspended in 30 ml of diethyl ether was added. Then, the mixture was stirred for 16 hours while the temperature was gradually increased to room temperature.

The solvent was distilled off under reduced pressure, and then, soluble matter was extracted from the residue using approximately 70 ml of dichloromethane. The obtained extracts were concentrated. Then, 50 ml of hexane was added thereto, and insoluble mater was removed by filtration. This solution was concentrated to approximately 10 ml and then left standing overnight at −30° C. The precipitated powder was collected by filtration and washed with hexane to obtain 0.384 g of an orange powder. This orange powder was dissolved by the addition of 5 ml of diethyl ether and left standing overnight at −30° C. The precipitated powder was collected by filtration and washed with hexane to obtain the target (8-octamethylfluoren-12'-yl-(2-(adamantan-1-yl)-8-methyl-3,3b,4,5,6,7,7a,8-octahydrocyclopenta[a]indene)) zirconium dichloride. The yield was 0.220 g, and the % yield was 17%.

The target compound was identified from measurement results of $^1$H-NMR. The measurement results are as follows.

$^1$H-NMR (270 MHz, CDCl$_3$, TMS reference): 67.98 (1H, s), 7.86 (1H, s), 7.60 (1H, s), 7.37 (1H, s), 6.19 (1H, J=1.6 Hz, d), 5.33 (1H, J=1.6 Hz, d), 3.58-3.44 (2H, m), 2.35-2.28 (1H, m), 2.18 (3H, s), 1.94-1.18 (54H, m).

[Preparation of Solid Catalyst Component]

A 100 mL three-neck flask equipped with a stirrer and thoroughly purged with nitrogen was charged with 32 mL of purified decane and 14.65 mmol (based on an aluminum atom) of solid polymethylaluminoxane (manufactured by Tosoh Finechem Corp.) at 30° C. under a stream of nitrogen to prepare a suspension. To the suspension, 12.75 mL of a 4.6 mmol/L solution of 50 mg (0.059 mmol based on a zirconium atom) of the preceding catalyst (A) synthesized in toluene was added with stirring. The stirring was terminated 1.5 hours later, and the obtained catalyst component was washed three times with 50 mL of decane by decantation and suspended in decane to prepare 50 mL of a slurry solution (B). In this catalyst component, the supporting rate of Zr was 100%.

[Preparation of Prepolymerization Catalyst Component]

The slurry solution (B) thus prepared was charged with 2.0 mL of a decane solution of diisobutyl aluminum hydride (2.0 mmol/mL based on an aluminum atom) and further with 7.5 mL (5.0 g) of 3-methyl-1-pentene under a stream of nitrogen. The stirring was terminated 1.5 hours later, and the obtained prepolymerization catalyst component was washed three times with 50 mL of decane by decantation. This prepolymerization catalyst component was suspended in decane to obtain 50 mL of decane slurry (C). The concentration of the prepolymerization catalyst component in the decane slurry (C) was 20 g/L (1.05 mmol Zr/L), and the Zr recovery rate was 90%.

[Example 1] (Polymer [A-1])

A SUS polymerization vessel (internal capacity: 1 L) equipped with a stirrer was charged with 425 mL of purified decane and 0.5 mL (1 mol) of a decane solution of diisobutyl aluminum hydride (2.0 mmol/mL based on an aluminum atom) at room temperature under a stream of nitrogen. Subsequently, 0.0005 mmol (based on a zirconium atom) of the preceding decane slurry solution (C) of the prepolymerization catalyst component prepared was added thereto, and 50 NmL of hydrogen was charged thereinto (first hydrogen charging). Subsequently, the polymerization vessel was continuously charged with a mixed solution of 250 mL of 4-methyl-1-pentene and 3.3 mL of 1-decene at a given rate over 2 hours. The start of this charging was referred to as the start of polymerization. The temperature was increased to 45° C. over 30 minutes from the start of polymerization and then kept at 45° C. for 4 hours. 90 NmL of hydrogen was charged thereinto 3 hours after the start of polymerization (second hydrogen charging). After a lapse of 4.5 hours from the start of polymerization, the temperature was decreased to room temperature, followed by depressurization. Immediately thereafter, the polymerization solution containing a white solid was filtered to obtain a solid substance. This solid substance was dried under reduced pressure at 80° C. for 8 hours to obtain a polymer [A-1]. The yield was 131 g. Results of measuring $^{13}$C-NMR, GPC, MFR and a decane-soluble portion of the polymer [A-1] are shown in Table 1.

[Example 2] (Polymer [A-2])

A polymer [A-2] was obtained by the same polymerization reaction as in Example 1 except that the amount of 1-decene charged was set to 1.3 ml. The yield was 125 g. Results of measuring $^{13}$C-NMR, GPC, MFR and a decane-soluble portion of the polymer [A-2] are shown in Table 1.

[Example 3] (Polymer [A-3])

(1) Synthesis of Polymer [A-3-1]

A polymer [A-3-1] was obtained by the same polymerization reaction as in Example 1 except that: the number of hydrogen charges was set to a total of 3; in addition to the first hydrogen charging before the start of polymerization as in Example 1, the second hydrogen charging was performed 1 hour after the start of polymerization, and the third hydrogen charging was performed 2 hours after the start of polymerization; and the first, second, and third amounts of hydrogen charged were each set to 60 NmL. The yield was 126 g. Results of measuring $^{13}$C-NMR, GPC, MFR and a decane-soluble portion of the polymer [A-3-1] are shown in Table 1.

(2) Synthesis of Polymer [A-3-2]

A polymer [A-3-2] was obtained by the same polymerization reaction as in the polymer [A-3-1] except that the first, second, and third amounts of hydrogen charged were each set to 35 NmL. The yield was 126 g. Results of measuring $^{13}$C-NMR, GPC, MFR and a decane-soluble portion of the polymer [A-3-2] are shown in Table 1.

(3) Preparation of Polymer [A-3]

The polymer [A-3-1] and the polymer [A-3-2] were thoroughly mixed at a polymer [A-3-1]:polymer [A-3-2] mass ratio of 65:35 to obtain a polymer [A-3]. Results of measuring $^{13}$C-NMR, GPC, MFR and a decane-soluble portion of the polymer [A-3] are shown in Table 1.

[Comparative Example 1] (Polymer [B-1])

A polymer [B-1] was obtained by the same polymerization reaction as in the polymer [A-3-1] except that the first, second, and third amounts of hydrogen charged were each set to 50 NmL. The yield was 131 g. Results of measuring $^{13}$C-NMR, GPC, MFR and a decane-soluble portion of the polymer [B-1] are shown in Table 1.

[Comparative Example 2] (Polymer [C-1]) and [Comparative Example 3] (Polymer [C-2])

Polymers [C-1] and [C-2] were obtained by changing the proportions of 4-methyl-1-pentene, 1-decene, 1-hexadecene, 1-octadecene, and hydrogen according to the methods of Comparative Examples 7 and 9, respectively, of International Publication No. WO 2006/054613. Results of measuring $^{13}$C-NMR, GPC, MFR and a decane-soluble portion are shown in Table 1.

<Pellet Preparation>

A polymer in an amount sufficient for pellet preparation was provided by carrying out polymerization a plurality of times, if necessary. 100 parts by mass of each polymer were mixed with 0.1 parts by mass of tri(2,4-di-t-butylphenyl) phosphate as a secondary antioxidant and 0.1 parts by mass of n-octadecyl-3-(4'-hydroxy-3',5'-di-t-butylphenyl) propionate as a heat stabilizer. After a lapse of appropriate time, the mixture was granulated under conditions of a set temperature of 260° C., an amount of the resin extruded of 60 g/min and the number of revolutions of 200 rpm using a twin-screw extruder BT-30 manufactured by PLABOR Research Laboratory of Plastics Technology Co., Ltd. (screw diameter: 30 mmφ, L/D: 46) to obtain pellets for evaluation.

The obtained pellets for evaluation were subjected to DSC measurement and melt tension measurement by methods mentioned later. The results are shown in Table 1.

<Press Sheet Preparation>

The pellets for evaluation were hot-pressed using a hot pressing machine to prepare a press sheet. A spacer and the pellets for evaluation were sandwiched between two brass plates and pressed to prepare a press sheet. A press sheet having the desired thickness was obtained by appropriately changing the thickness of the spacer. The hot press was performed by maintaining the resin at 270° C. until complete melting, then pressing the resultant under a condition of 100 KG/cm$^2$ for 3 minutes, followed by pressing under conditions of 20° C. and 100 KG/cm$^2$ for 3 minutes immediately thereafter.

The obtained press sheet was evaluated for its Vicat softening temperature (3 mm thick press sheet was used) and steam resistance (3 mm thick and 10 mm thick press sheets were used) by methods mentioned later. The results are shown in Table 1.

<Film Preparation>

The pellets for evaluation were molded under a die temperature condition of 270° C. at a roll temperature of 70° C. at a take-up rate of 2.0 m/min in a single-screw extruder manufactured by Thermoplastic Industry Co., Ltd. (screw diameter: 20 mmφ, L/D: 28) equipped with a coat hanger-type T-shaped die (lip shape: 270×0.8 mm) to obtain a film having a thickness of 50 µm.

The obtained film was evaluated for its steam resistance, modulus of elasticity at a high temperature and tensile elongation by methods mentioned later. The results are shown in Table 1.

Hereinafter, the methods for evaluating the polymer, the pellets for evaluation, the press sheet and the film will be specifically described. The evaluation results are shown in Table 1. In the table, "-" means no data. The Figure shows the relationship between a heat of fusion and a melting point in Examples and Comparative Examples. An area on and above the solid line shown in the Figure represents a range that satisfies "$\Delta Hm \geq 0.5 \times Tm - 76$", and an area below the solid line represents a range that does not satisfy "$\Delta Hm \geq 0.5 \times Tm - 76$".

[Content of Constitutional Unit]

The content of the constitutional unit derived from at least one olefin (comonomer) selected from ethylene and an α-olefin having 3 to 20 carbon atoms (except for 4-methyl-1-pentene) in the 4-methyl-1-pentene polymer was calculated from $^{13}$C-NMR spectra using the following apparatus and conditions.

The measurement was performed using AVANCE III cryo-500 nuclear magnetic resonance apparatus manufactured by Bruker BioSpin under the following conditions: solvent: an o-dichlorobenzene/benzene-$d_6$ (4/1 v/v) mixed solvent; sample concentration: 55 mg/0.6 mL; measurement temperature: 120° C.; observed nucleus: $^{13}$C (125 MHz); sequence: single-pulse proton broadband decoupling; pulse width: 5.0 ρsec (45° pulse), repetition time: 5.5 sec; the number of integrations: 64; and chemical shift reference value: 128 ppm of benzene-$d_6$. The content of the constitutional unit derived from the comonomer was calculated using an integrated value of the backbone methine signals according to the following expression.

Content of the constitutional unit derived from the comonomer (%)=[$P/(P+M)$]×100 wherein P represents the total peak area of comonomer backbone methine signals, and M represents the total peak area of 4-methyl-1-pentene backbone methine signals.

[Meso Diad Fraction]

The meso diad isotacticity (meso diad fraction) of the 4-methyl-1-pentene polymer was defined as the fraction of isobutyl branches having the same orientation when the head-to-tail linkage of arbitrary two 4-methyl-1-pentene units in the polymer chain is expressed by planar zigzag arrangement, and determined from $^{13}$C-NMR spectra according to the following expression.

Meso Diad isotacticity (%)=[$m/(m+r)$]×100 wherein m and r each represent absorption intensity, defined below, derived from the backbone methylenes of head-to-tail linked 4-methyl-1-pentene units represented by the formula given below.

The $^{13}$C-NMR spectra were measured using AVANCE III cryo-500 nuclear magnetic resonance apparatus manufactured by Bruker BioSpin under the following conditions: solvent: an o-dichlorobenzene/benzene-$d_6$ (4/1 v/v) mixed solvent; sample concentration: 60 mg/0.6 mL; measurement temperature: 120° C.; observed nucleus: $^{13}$C (125 MHz); sequence: single-pulse proton broadband decoupling; pulse width: 5.0 ρsec (45° pulse), repetition time: 5.5 sec; and chemical shift reference value: 128 ppm of benzene-$d_6$.

Peak regions were classified into a first region on a high-magnetic field side and a second region on a low-magnetic field side by delimiting a region of 41.5 to 43.3 ppm at the local minimum point of a peak profile.

In the first region, the backbone methylenes in the linkage of the two 4-methyl-1-pentene units resonated. The first region was regarded as a 4-methyl-1-pentene homopolymer, and the intergrated value thereof was referred to as "m". In the second region, the backbone methylenes in the linkage of the two 4-methyl-1-pentene units resonated, and the integrated value thereof was referred to as "r". A value less than 0.01% was equal to or lower than the detection limit.

[Mw/Mn, Mz/Mw, and Proportion of Polymer Having Molecular Weight of $1 \times 10^6$ or Larger]

The weight-average molecular weight (Mw), the number-average molecular weight (Mn) and the Z-average molecular weight (Mz) were measured by GPC. The GPC measurement was performed under conditions given below. Also, the weight-average molecular weight (Mw), the number-average molecular weight (Mn) and the Z-average molecular weight (Mz) were determined on the basis of the conversion method described below by preparing a calibration curve using commercially available polystyrene monodisperse standards.

(Measurement Condition)

Apparatus: gel permeation chromatograph HLC-8321 GPC/HT (manufactured by Tosoh Corp.)

Organic solvent: o-dichlorobenzene

Column: two columns of TSKgel GMH6-HT and two columns of TSKgel GMH6-HTL (all manufactured by Tosoh Corp.)

Flow rate: 1.0 ml/min

Sample: 0.15 mg/mL o-dichlorobenzene solution

Temperature: 140° C.

Molecular weight conversion: general calibration method based on PS

Coefficients of the Mark-Houwink viscosity equation were used in the calculation of general calibration. The values described in the literature (J. Polym. Sci., Part A-2, 8, 1803 (1970)) were used as respective Mark-Houwink coefficients of PS.

In this GPC chart based on PS, the ratio of the integrated area value of components at 1,000,000 or larger to the total integrated area of the chart was referred to as the proportion of a component having a molecular weight of $1 \times 10^6$ or larger.

[Melt Flow Rate (MFR)]

The melt flow rate (MFR) was measured under conditions of 260° C. and a 5 kg load in conformity to ASTM D1238.

[Amount of Decane-Soluble Portion]

200 mL of n-decane was added to 5 g of each polymer, which was then dissolved by heating at 145° C. for 1 hour. The mixture was cooled to 23° C. and left for 30 minutes. Then, precipitates (n-decane-insoluble portion) were filtered off. The filtrate was placed in approximately 3-fold amount of acetone to precipitate the component dissolved in n-decane. The precipitates were filtered off from acetone and dried. The mass of the precipitates was measured. No residue was observed even when the filtrate was concentrated to dryness. The amount of the n-decane-soluble portion was determined according to the following expression.

Amount of the n-decane-soluble portion (% by mass)=[Precipitate mass/Polymer mass]×100

[Melting Point and Heat of Fusion]

An aluminum pan for measurement was covered with approximately 5 mg of a sample, and the temperature was increased to 280° C. at 10° C./min using a DSC measurement apparatus manufactured by Seiko Instruments Inc. (DSC220C). The temperature was kept at 280° C. for 5 minutes and then decreased to 20° C. at 10° C./min. The temperature was kept at 20° C. for 5 minutes and then increased to 280° C. at 10° C./min. A temperature at which the summit of a crystal melting peak appeared, observed in the second temperature increase was referred to as the melting point. The heat of fusion was calculated from the integrated value of this crystal melting peak.

[Melt Tension]

The melt tension was measured using an apparatus Capilograph 1D manufactured by Toyo Seiki Seisaku-sho, Ltd. A sample was added to a melting furnace (diameter: 9.55 mm) set to 260° C., thoroughly melted, then passed through a capillary having L/D of 8/2.095 mm and an inflow angle of 180° at an extrusion rate of 15 mm/min, and passed through a pulley mounted at a position of 58 cm from the lower part of the capillary. Stress applied to the pulley when the melted resin was taken up at a rate of 15 m/min was measured. The stress was referred to as the melt tension.

[Vicat Softening Temperature]

A press sheet having a thickness of 3 mm was subjected to a Vicat softening temperature test at a rate of temperature increase of 50° C./hr at a test load of 10 N in a silicone oil using a tester manufactured by Yasuda Seiki Seisakusho, Ltd. in conformity to ASTM D1525.

[Steam Resistance Evaluation]

The steam resistance was evaluated using a HAST tester PLAMOUNT (PM252) manufactured by Kusumoto Chemicals, Ltd. A 0.05 mm (50 μm) thick film and 3 mm thick and 10 mm thick press sheets were each maintained under conditions of 135° C. and 95% RH for 30 minutes and then cooled to 23° C., and this operation was performed by 2 cycles. Then, the appearance of each test piece was confirmed. A test piece evidently having whitening ascribable to voids or cracks was evaluated as poor (indicated by x-mark); a test piece having a trace amount of whitening ascribable to voids or cracks was evaluated as fair (indicated by triangle); and a test piece having no whitening ascribable to voids or cracks was evaluated as good (indicated by circle).

[Modulus E' of Elasticity at High Temperature (170° C.)]

The film described above was measured at from −20° C. to 250° C. under conditions of a rate of temperature increase of 4° C./min, a frequency of 1 Hz, and 0.1% strain using RSA-III manufactured by TA instruments on a measurement mode set to tensile. The value of storage modulus E' of elasticity at 170° C. was read.

[Film Tensile Elongation]

The tensile elongation serving as tensile characteristics was measured on the film mentioned above as a test piece at a pulling rate of 200 mm/min using a universal tensile tester 3380 manufactured by Instron in conformity to JIS K678.

TABLE 1

|  |  |  | Example 1 | Example 2 |  |  | Example 3 | Comparative Example 1 | Comparative Example 2 | Comparative Example 3 |
|---|---|---|---|---|---|---|---|---|---|---|
| General physical property | Polymer |  | [A-1] | [A-2] | [A-3-1] | [A-3-2] | [A-3] | [B-1] | [C-1] | [C-2] |
|  | Amount of 4-methyl-1-pentene | mol % | 98.5 | 99.4 | 98.5 | 98.3 | 98.4 | 98.7 | 98.4 | 98.3 |
|  | Comonomer species |  | Decane | Decane | Decane | Decane | Decane | Decane | Decane | Mixture of 1-hexadecene, 1-octadecene |
|  | Content of constitutional unit derived from comonomer | mol % | 1.5 | 0.6 | 1.5 | 1.5 | 1.5 | 1.3 | 1.6 | 2.8 |
|  | Meso diad isotacticity fraction (m) | % | 99.1 | 98.8 | 99.4 | 99.3 | 99.4 | 99.4 | 97.5 | 98.3 |
|  | Amount of decane-soluble portion at 23° C. | wt % | 0.1 | 0.1 | 0.1 | 0.1 | 0.1 | 0.1 | 5.1 | 24 |
|  | MFR | g/10 min | 12 | 11 | 110 | 0.9 | 27 | 11 | 6 | 9 |
|  | Molecular weight distribution (Mw/Mn) |  | 5.0 | 4.7 | 3.0 | 3.0 | 4.4 | 3.5 | 6.1 | 5.6 |
|  | Molecular weight distribution (Mz/Mw) |  | 3.1 | 3.3 | 2.3 | 2.4 | 3.2 | 2.6 | 3.6 | 3.3 |
|  | Proportion of component having molecular weight of $1 \times 10^6$ or larger | wt % | 22 | 19.3 | 10 | 38 | 17 | 11.8 | 16 | 16.3 |
|  | Melting point | ° C. | 235 | 240 | 235 | 236 | 236 | 235 | 232 | 224 |
|  | Heat of fusion | J/g | 47 | 51 | 47 | 48 | 47 | 46 | 39 | 23 |
|  | Value of (0.5 × Tm − 76) |  | 41.4 | 44.0 | 41.5 | 42.0 | 42.0 | 41.5 | 40.0 | 36.0 |
|  | Melt tension | mN | 23 | 25 | 10 | 30 | 21 | 14 | 19 | 19 |
|  | Vicat softening temperature | ° C. | 187 | 191 | 185 | 187 | 186 | 187 | 175 | 142 |
| Steam resistance | 0.05 mm thick |  | ○ | ○ | — | — | ○ | △ | ○ | ○ |
|  | 3 mm thick |  | ○ | ○ | — | — | ○ | x | ○ | ○ |
|  | 10 mm thick |  | △ | △ | — | — | △ | x | △ | △ |
| Film physical property | Modulus E' of elasticity at high temperature | MPa | 34 | 43 | — | — | 35 | 36 | 26 | 15 |
|  | Tensile elongation | % | 190 | 180 | — | — | 175 | 90 | 180 | 290 |

The invention claimed is:

1. A molded article comprising a resin composition comprising a 4-methyl-1-pentene polymer wherein: a content of a constitutional unit derived from the 4-methyl-1-pentene is 90 to 100% by mol; a content of a constitutional unit derived from at least one olefin selected from ethylene and an α-olefin, other than the 4-methyl-1-pentene, having 3 to 20 carbon atoms is 0 to 10% by mol; and the 4-methyl-1-pentene polymer satisfies all the following requirements (a) to (f):
   (a) a meso diad fraction (m) measured by $^{13}$C-NMR falls within the range of 98 to 100%;
   (b) a ratio of Z-average molecular weight Mz to weight-average molecular weight Mw (Mz/Mw) measured by gel permeation chromatography (GPC) falls within the range of 2.5 to 20;
   (c) a ratio of weight-average molecular weight Mw to number-average molecular weight Mn (Mw/Mn) measured by gel permeation chromatography (GPC) falls within the range of 3.6 to 30;
   (d) a melt flow rate (MFR) measured under conditions of 260° C. and a 5 kg load in conformity to ASTM D1238 falls within the range of 0.1 to 500 g/10 min;
   (e) an amount of a decane-soluble portion at 23° C. is 1.0% by mass or less and
   (f) a proportion of a polymer having a molecular weight of 1×10$^6$ or larger measured by gel permeation chromatography (GPC) is 15% by mass or more.

2. The molded article according to claim 1, wherein the 4-methyl-1-pentene polymer further satisfies the following requirement (g):
   (g) a heat of fusion and a melting point of the 4-methyl-1-pentene polymer measured by differential scanning calorimetry (DSC) satisfy the following requirements (i) and (ii):
   (i) the following expression (1) holds:

$$\Delta Hm \geq 0.5 \times Tm - 76 \qquad \text{Expression (1)}$$

wherein the heat of fusion is defined as ΔHm J/g, and the melting point is defined as Tm ° C.; and
   (ii) the melting point falls within the range of 200 to 260° C.

3. The molded article according to claim 1, wherein a maximum thickness is 100 mm or smaller and a minimum thickness is 0.001 mm or larger.

4. The molded article according to claim 3, wherein the molded article is an injection molded article or an extrusion molded article.

5. The molded article according to claim 1, wherein the molded article is an injection molded article or an extrusion molded article.

6. The molded article according to claim 1, wherein the molded article is a film.

7. A container, the container being a molded article according to claim 1.

8. The container according to claim 7, the container being intended for medical treatment.

9. The container according to claim 7, the container being intended for infants.

10. The container according to claim 7, the container being intended for food.

11. The container according to claim 7, the container being intended for life, physicochemical experiments, chemicals or caregiving.

12. An instrument, the instrument being a molded article according to claim 1.

13. The instrument according to claim 12, the instrument being intended for medical treatment.

14. The instrument according to claim 12, the instrument being intended for infants.

15. The instrument according to claim 12, the instrument being intended for food.

16. The instrument according to claim 12, the instrument being intended for life, physicochemical experiments, chemicals or caregiving.

* * * * *